(12) United States Patent
Chestnut et al.

(10) Patent No.: US 10,431,108 B2
(45) Date of Patent: Oct. 1, 2019

(54) COMPUTER-IMPLEMENTED TECHNIQUES FOR INTERACTIVELY TRAINING USERS TO PERFORM FOOD QUALITY, FOOD SAFETY, AND WORKPLACE SAFETY TASKS

(71) Applicant: NSF International, Ann Arbor, MI (US)

(72) Inventors: Thomas Chestnut, Saline, MI (US); Jennifer Leighanne Tong, Troy, OH (US)

(73) Assignee: NSF International, Ann Arbor, MI (US)

( * ) Notice: Subject to any disclaimer, the term of this patent is extended or adjusted under 35 U.S.C. 154(b) by 575 days.

(21) Appl. No.: 15/091,351

(22) Filed: Apr. 5, 2016

(65) Prior Publication Data

US 2016/0307459 A1 Oct. 20, 2016

Related U.S. Application Data

(60) Provisional application No. 62/194,448, filed on Jul. 20, 2015, provisional application No. 62/149,711, filed on Apr. 20, 2015.

(51) Int. Cl.
*G09B 5/02* (2006.01)
*G06F 3/16* (2006.01)
(Continued)

(52) U.S. Cl.
CPC ............... *G09B 5/02* (2013.01); *G06F 3/011* (2013.01); *G06F 3/14* (2013.01); *G06F 3/16* (2013.01);
(Continued)

(58) Field of Classification Search
CPC ...... G02B 2027/0138; G02B 2027/014; G02B 2027/0141; G02B 27/0172; G06F 1/163;
(Continued)

(56) References Cited

U.S. PATENT DOCUMENTS 8,914,472 B1 12/2014 Lee et al.
8,989,521 B1 * 3/2015 Ho ..................... G06K 9/00711
348/61
(Continued)

FOREIGN PATENT DOCUMENTS

GB 2493134 A 1/2013

OTHER PUBLICATIONS

International Search Report for Application No. PCT/US2016/026039, dated Jun. 17, 2016, 5 pages.
(Continued)

*Primary Examiner* — LaTanya Bibbins
(74) *Attorney, Agent, or Firm* — Howard & Howard Attorneys PLLC

(57) ABSTRACT

Computer-implemented techniques for interactively training a user in performing a predetermined task related to at least one of food safety, workplace safety and food quality using a head wearable device are provided. The head wearable device comprises a digital display positioned within a field of view of the user, a camera to capture visual data from a first-person perspective, a user input device to provide control signals, and a processor. A series of steps are visually presented on the digital display in a predetermined order to direct the user through a process of performing the task. Visual data captured by the camera and the control signals provided from the user input device are analyzed during performance of one or more steps of the task. The computer-implemented techniques evaluate the user's performance of the one or more steps based on analysis of the visual data and the control signals.

25 Claims, 13 Drawing Sheets

(51) Int. Cl.
*G09G 5/12* (2006.01)
*G06F 3/14* (2006.01)
*G06Q 30/00* (2012.01)
*G09B 19/00* (2006.01)
*G06Q 10/06* (2012.01)
*G09B 5/00* (2006.01)
*G06F 3/01* (2006.01)
*G06K 9/00* (2006.01)
*G02B 27/01* (2006.01)

(52) U.S. Cl.
CPC ..... *G06K 9/00335* (2013.01); *G06K 9/00671* (2013.01); *G06Q 10/0639* (2013.01); *G06Q 30/018* (2013.01); *G09B 5/00* (2013.01); *G09B 19/003* (2013.01); *G09B 19/0076* (2013.01); *G09G 5/12* (2013.01); *G02B 27/017* (2013.01); *G02B 2027/014* (2013.01); *G02B 2027/0141* (2013.01); *G09G 2370/02* (2013.01); *G09G 2370/16* (2013.01)

(58) Field of Classification Search
CPC ......... G06F 3/14; G06F 3/16; G06Q 10/0639; G06Q 30/018; G09B 19/003; G09B 19/0076; G09B 5/00; G09B 5/02; G09G 2370/02; G09G 2370/16; G09G 5/12
See application file for complete search history.

(56) References Cited

U.S. PATENT DOCUMENTS

| | | | |
|---|---|---|---|
| 2002/0067372 | A1 | 6/2002 | Friedrich et al. |
| 2004/0205256 | A1 | 10/2004 | Hoffman et al. |
| 2011/0306398 | A1* | 12/2011 | Boch .................. G06F 3/011 463/7 |
| 2012/0031920 | A1 | 9/2012 | Belfort et al. |
| 2013/0083063 | A1 | 4/2013 | Geisner et al. |
| 2014/0139551 | A1 | 5/2014 | McCulloch et al. |
| 2014/0368980 | A1* | 12/2014 | Nanavati ............ G06Q 30/016 361/679.03 |

OTHER PUBLICATIONS

International Search Report for Application No. PCT/US2016/026034 dated Jun. 14, 2016, 5 pages.
U.S. Office Action for U.S. Appl. No. 15/091,303, dated Jun. 20, 2018; 26 pages.
European Office Action for Application No. 16 718 563.6-1958, dated Dec. 10, 2017; 06 pages.
European Office Action for Application No. 16 718 777.2, dated Dec. 10, 2017; 02 pages.

* cited by examiner

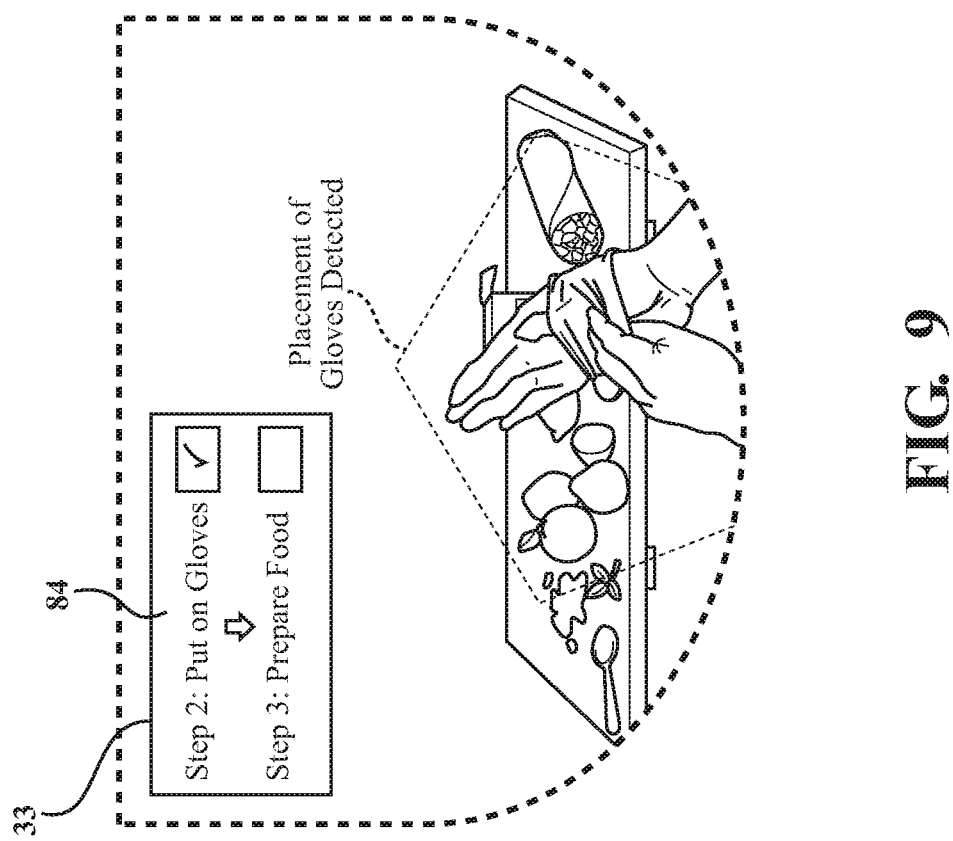

COMPUTER-IMPLEMENTED TECHNIQUES FOR INTERACTIVELY TRAINING USERS TO PERFORM FOOD QUALITY, FOOD SAFETY, AND WORKPLACE SAFETY TASKS

CROSS REFERENCE TO RELATED APPLICATIONS

This application claims priority to and the benefit of U.S. provisional patent application No. 62/149,711, filed Apr. 20, 2015 and U.S. provisional patent No. 62/194,448 filed Jul. 20, 2015, the disclosures of each being hereby incorporated by reference in their entirety.

TECHNICAL FIELD (COMPUTER GRAPHICS PROCESSING, OPERATOR INTERFACE PROCESSING, AND SELECTIVE VISUAL DISPLAY SYSTEMS/Operator body-mounted heads-up display (e.g., helmet mounted display)).

The disclosure relates to data processing techniques for specific applications relating to interactively training a user in performing a food or workplace safety or food quality task using a head wearable device.

BACKGROUND

In food and workplace industries, safety and quality are of high importance in all industry segments. In effort to achieve safety and quality, on-the-job training is performed at many steps of the process, such as foodservice, retail, and supply chain steps of the process. There are also numerous efforts underway to improve food safety and quality, including the emergence of Global Food Safety Initiative (GFSI), advancements in training and auditing, and new government regulations, such as the FDA Food Safety Modernization Act (FSMA). Despite the performance of traditional on-the-job training in view of these initiatives, the number of workplace injuries, food safety related recalls, food borne illnesses, hospitalizations, and deaths per year is ever increasing. As such, traditional training relating to food safety, food quality or workplace safety are inadequate.

Most safety or quality issues stem from an inability to properly train handlers or workers to ensure the effective and consistent execution of proper food handling or workplace practices. Accordingly, there is a need to transform how traditional training is directed, monitored, and improved such that food safety, food quality and workplace safety issues can be effectively reduced. There is a further need for developing a wearable technology solution focusing on employee training, knowledge transfer, and ensuring consistent execution of such tasks.

SUMMARY AND ADVANTAGES

One embodiment of a head wearable device for training a user in performing a predetermined task related to at least one of food safety, food quality and workplace safety is provided. The head wearable device comprises a digital display being positionable within a field of view of the user, a camera being configured to capture visual data from a first-person perspective of the user, a user input device being configured to provide control signals triggered by input from the user, and a non-transitory computer readable memory. A processor is in communication with the digital display, camera, user input device and memory. The memory includes instructions, which when executed by the processor, cause the processor to visually present on the digital display a series of steps in a predetermined order directing the user through a process of performing the predetermined task. Visual signals captured by the camera and the control signals provided from the user input device are analyzed during the user's attempt to perform at least one of the steps. The processor evaluates the user's attempt to perform the at least one step based on analysis of the visual data and the control signals.

One embodiment of a computer-implemented method for training a user in performing a predetermined task related to at least one of food safety, food quality and workplace safety using a head wearable device is provided. The head wearable device comprises a digital display being positionable within a field of view of the user, a camera being configured to capture visual data from a first-person perspective of the user, a user input device being configured to provide control signals triggered by input from the user, and a processor in communication with the digital display, camera, user input device and memory. The computer-implemented method comprises visually presenting on the digital display a series of steps in a predetermined order directing the user through a process of performing the predetermined task. Visual signals captured by the camera and the control signals provided from the user input device are analyzed during the user's attempt to perform at least one of the steps. The user's attempt to perform the at least one step is evaluated based on analysis of the visual data and the control signals.

One example of a non-transitory computer usable medium for use with a head wearable device for training a user in performing a predetermined task related to at least one of food safety, food quality and workplace safety is provided. The head wearable device comprises a digital display being positionable within a field of view of the user, a camera being configured to capture visual data from a first-person perspective of the user, a user input device being configured to provide control signals triggered by input from the user, and a processor in communication with the digital display, camera, user input device and memory. The non-transitory computer usable medium includes instructions, which when executed by the processor, cause the processor to visually present on the digital display a series of steps in a predetermined order directing the user through a process of performing the predetermined task. Visual signals captured by the camera and the control signals provided from the user input device are analyzed during the user's attempt to perform at least one of the steps. The user's attempt to perform the at least one step is evaluated based on analysis of the visual data and the control signals.

The techniques provide the use of specialized hardware in the area of training users to improve food safety, food quality and workplace safety. The head wearable technology solution (e.g. a head wearable device and specialized software implemented thereon) focuses on training, knowledge transfer, and ensuring consistent execution of the predetermined task. Such techniques transform how traditional tasks, such as training in the area of food safety, food quality and workplace safety are performed, monitored, and assessed such that safety and quality are continuously improved. As such, the invention provides a solution to the ever-increasing complexity and demand for such food or workplace related services. The head wearable device properly and interactively trains the user to ensure the effective and consistent execution of food or workplace practices. A third party no longer needs to visit the facility to perform or train the user on the predetermined task. Instead, as described below, the techniques provide the head wearable device with the capability to direct and monitor performance of the training in an automated fashion. Therefore, labor and travel expenses are significantly reduced or eliminated. This allows a greater number of such predetermined tasks to be performed because of such efficiency.

Moreover, the techniques described herein provide interactive involvement between the head wearable device and the user at the first location. As will be described in detail below, the head wearable device is configured to pre-map steps of the task and immediately recognize variations when any one or more of the steps are executed correctly or incorrectly. The head wearable device provides feedback or alerts on the digital display screen to interact with the user. The head wearable device includes specialized hardware and software to implement ambient intelligence to be sensitive to and respond to the environmental occurrences, such as presence of relevant objects or movements within the field of view of the head wearable device during performance of the predetermined task. For example, the head wearable device may be configured to recognize gloves moving onto the user's hand or a thermometer being inserted into a food product. The head wearable device autonomously interacts with the user based on information captured and immediately presents suggested corrective actions or feedback in real-time to the head wearable device to guide the user through training. Thus, the head wearable device and method further provide execution of the predetermined task at a level of compliance not previously before achievable. Training is transformed into an interactive learning experience. Wearable technology provides the platform for a new level of predictive analytics that was never attainable in the past.

Furthermore, the techniques track and trend compliance against task execution. That is, the head wearable device is configured to capture information giving valuable, not previously obtainable, insight into why users are not properly executing certain steps of the predetermined task. Such information may help ultimately determine that the predetermined task is not executed properly because of, for example, circumstances at the workplace, inadequate training, difficulty in repeatability of the task, and the like.

With such techniques, the user retains a significant amount of information because the user is actively performing the predetermined task first-hand, at the automated direction of the head wearable device. The user is not passively watching someone else perform the predetermined task. In turn, the user will be able to promote a better culture of safety and quality within the operation, thereby further solidifying brand protection and public health. Of course, the system, head wearable device, methods, and computer readable mediums, as descried herein may exhibit or provide advantages other than those described above. The advantages described above are not intended to limit the scope of the claimed invention.

BRIEF DESCRIPTION OF THE DRAWINGS

Advantages of may become readily appreciated as the same becomes better understood by reference to the following detailed description when considered in connection with the accompanying drawings wherein:

FIG. 9 is yet an example view for one lens the head wearable device from a first-person perspective of the user wherein the training program recognizes the user's compliance in performing another sample step of the predetermined task based on analyzing signals captured during performance of the step.

DETAILED DESCRIPTION

Referring to the Figures, wherein like numerals indicate like or corresponding parts throughout the several views, a system 10, head wearable device 20, and methods for interactively training a user in performing a predetermined task related to at least one of food safety, food quality and workplace safety are provided.

I. System Overview

Figure 1:
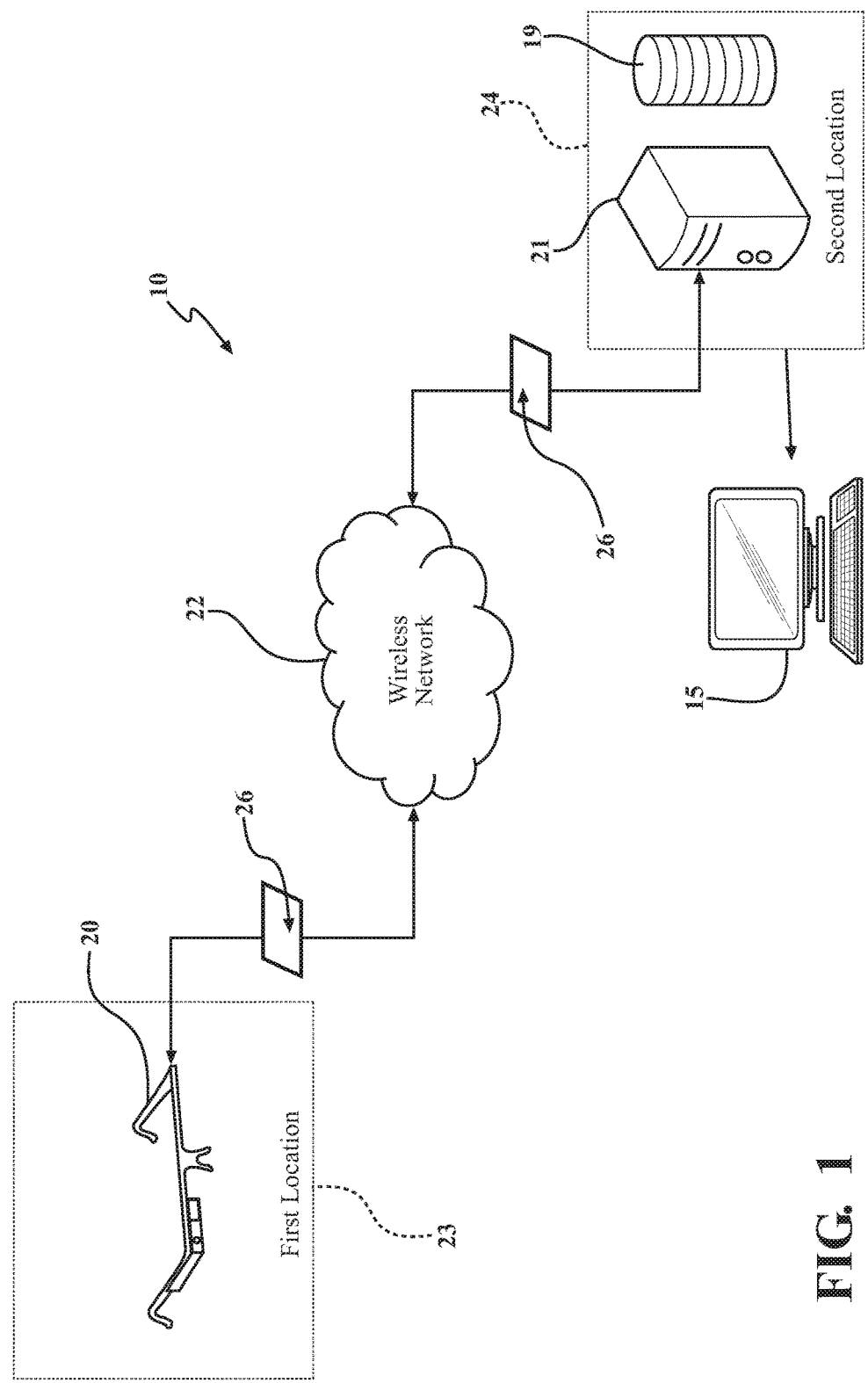
FIG. 1 is a layout of a system for interactively training a user in performing a predetermined task related to at least one of food safety, food quality and workplace safety using a head wearable device according to one embodiment.

One embodiment of the system 10 is illustrated in FIG. 1. The system 10 includes the head wearable device 20 and a server 21 that is remote from the head wearable device 20. As shown throughout, and as described in detail below, one embodiment of the head wearable device 20 includes eyewear. The head wearable device 20 is configured to capture audio and visual data 26 during the user's performance of the predetermined task.

Additional details of the system 10, head wearable device 20, and remote computing system 21 are described in co-filed U.S. application Ser. No. 15/091,303 the full disclosure of which is hereby incorporated by reference in its entirety.

The predetermined task for which the user is to receive training may include on-the-job functions relating to at least one of food safety, food quality and workplace safety. Additional details of relating to food safety, food quality, and/or workplace safety tasks are described in co-filed U.S. application Ser. No. 15/091,303 the full disclosure of which is hereby incorporated by reference in its entirety. Examples of such tasks are described in detail below. The user at a first location 23 wears the head wearable device 20. As such, the predetermined task is physically performed at the first location 23 by the user. The user may be an employee, manager, person-in-charge, or any other person assigned to perform the predetermined task at the first location 23. The first location 23 may include any public or private, workplace, restaurant, kitchen, shipping vehicle or container, manufacturing plant, farm, market, warehouse, vendor, or the like.

The server 21 is provided at a remote, second location 24. The second location 24 may be any suitable location for hosting the sever 21. In one example, the second location 24 is a facility of a party enlisted to engage in training, executing, monitoring, or assessing the performance of the predetermined task.

In FIG. 1, the server 21 may host the head wearable device 20 by transmitting information to, and receiving information from, the head wearable device 20, and vice-versa. The server 21 may be both a running instance of some software capable of accepting requests from clients, and the computer such a server runs on. The sever 21 may operate within a client-server architecture where the sever 21 is a computer program running to serve the requests of programs implemented on the head wearable device 20, i.e., the "client." The server 21 may communicate with the head wearable device 20 while the head wearable device 20 is at the first location 23. The server 21 is capable of receiving the audio and visual data 26 from the head wearable device 20, and vice-versa. The server 21 may be any suitable system for allowing communication with the head wearable device 20. In other embodiments, the head wearable device 20 is capable of executing any of the techniques described herein without the need for, or involvement from, the server 21.

Figure 2:
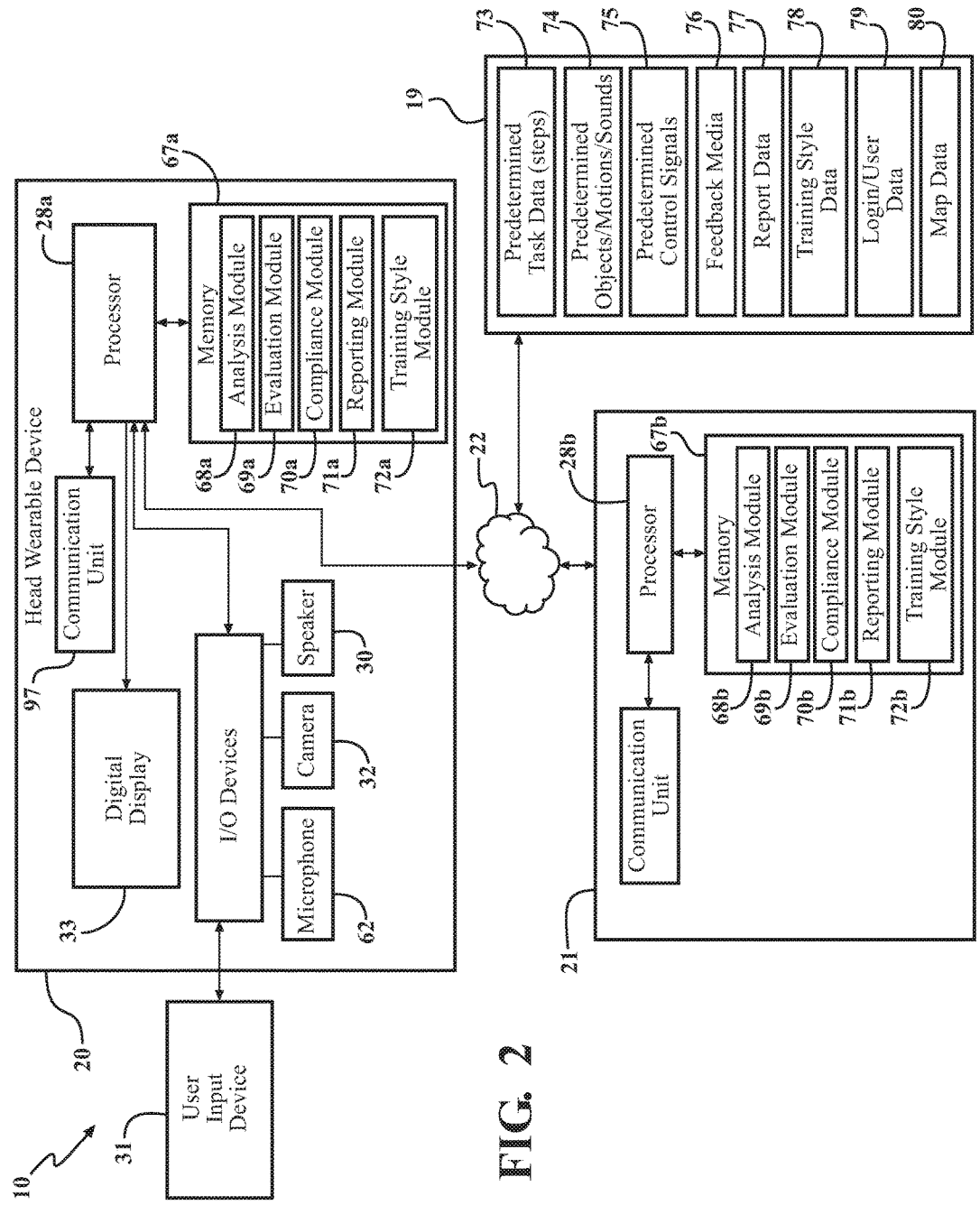
FIG. 2 is a block diagram of the system showing components of the head wearable device and a server remote from the head wearable device according to one embodiment.

The head wearable device 20 and the server 21 are in communication with one another over a network 22, such as a wireless network, as shown in FIGS. 1 and 2. The server 21 is connected to the network 22. The network 22 may take many forms. In one example, the network 22 is a wireless network. The wireless network 22 may be any suitable network that enables wireless communication between the server 21 and the head wearable device 20. The wireless network 22 may be Wi-Fi®, cellular, cloud-based, or other type. The network 22 may have wired aspects. For example, the server 21 and/or memory 29 may be wired to the network 22. Data directing, monitoring and improving performance of the predetermined task may be transmitted and received between the head wearable device 20 and the server 21 through the wireless network 22.

As will be described below, the server 21 may be in communication with a learning management system or database 19, which is configured to store relevant information to implement the method 12. The data provided by the server 21 may be retrieved from the database 19 or saved to the database 19 for later access.

An analysis computer 15 may be in communication with the server 21 and/or database 19 for accessing information stored thereon. The analysis computer 15 may be at the second location 24 or any other suitable remote location besides the second location 24. The analysis computer 15 may be used to investigate, validate, update, modify, or eliminate programmed direction of the predetermined tasks. The server 21 may be configured to automatically evaluate obtained audio and visual data 26 and automatically validate, modify or eliminate tasks without operator involvement. This may be done to evolve future directing programs.

Figure 3:
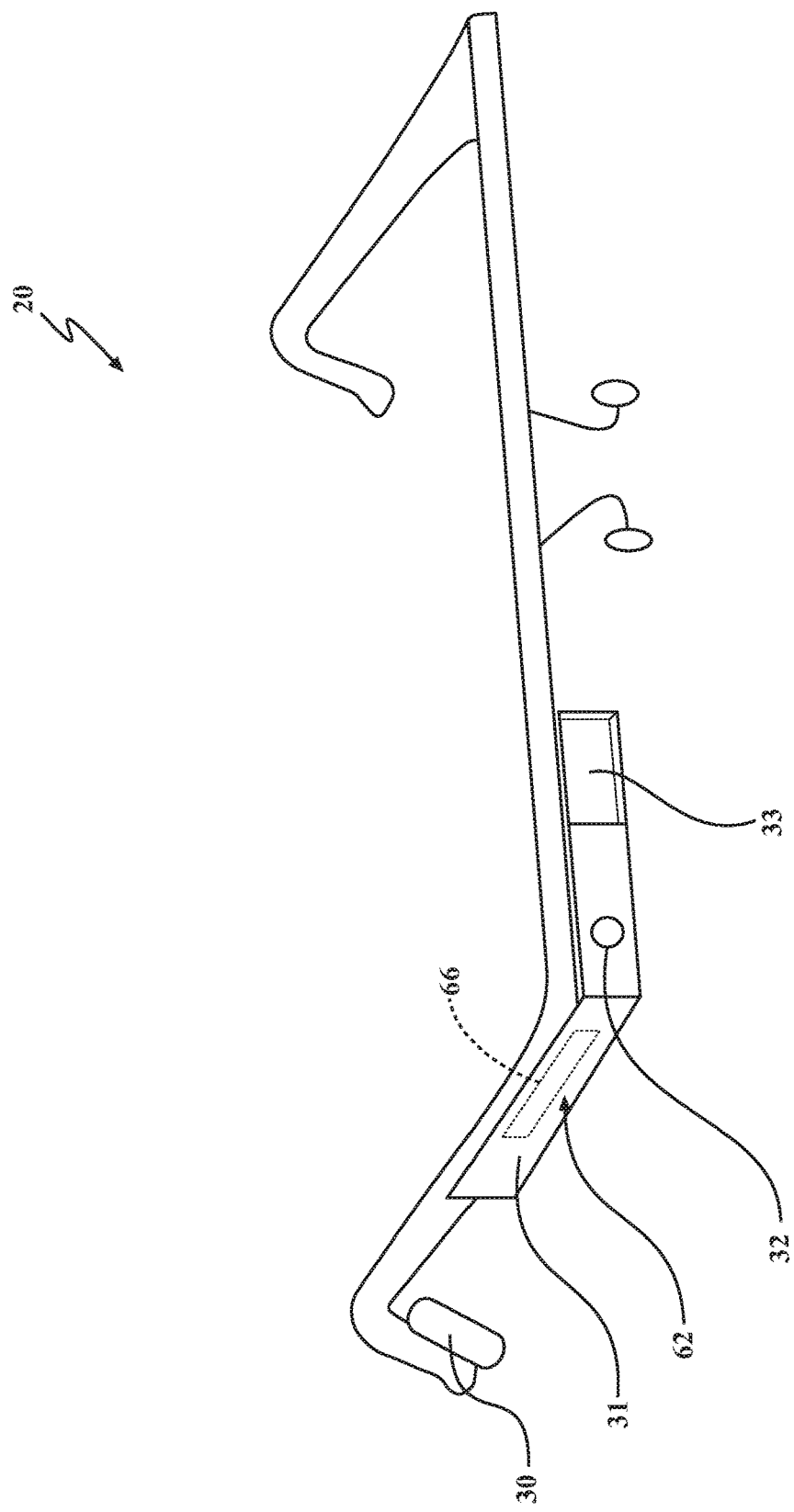
FIG. 3 is a perspective view of the head wearable device according to one embodiment.
Figure 4:
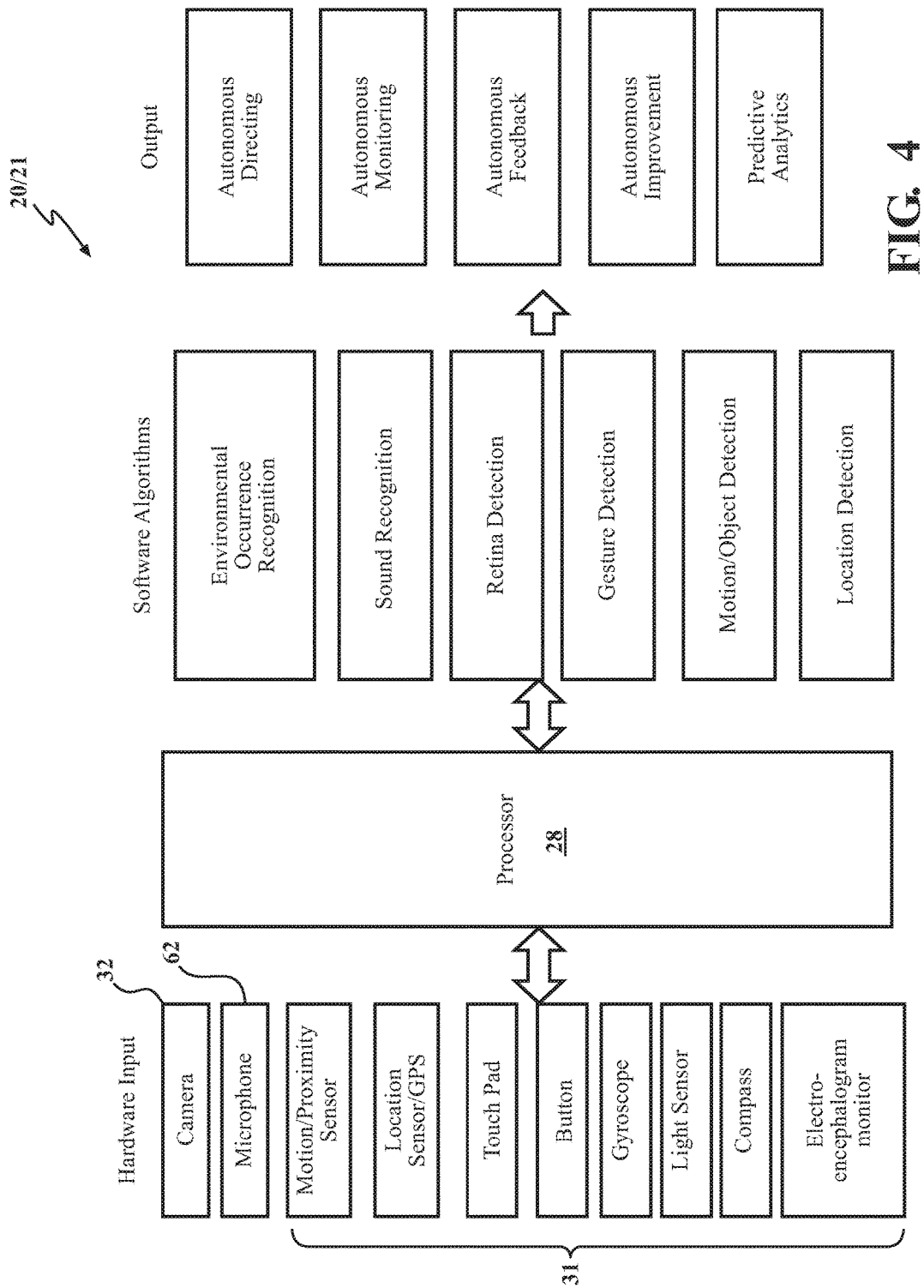
FIG. 4 is a block diagram of specialized hardware and algorithms implemented on the head wearable device and/or server according to one embodiment.

Components of the head wearable device 20 are shown in FIGS. 2-4 and one embodiment of the head wearable device 20 is illustrated in FIG. 3. The head wearable device 20 is worn by the user in such a way that the head wearable device 20 is supported by the head of the user leaving the hands and arms available to perform the predetermined task. The head wearable device 20 in FIG. 3 is more specifically eyewear. In a preferred embodiment, the head wearable device 20 is a Google Glass® wearable device. Google Glass® is a glasses type wearable device including the components described herein.

The head wearable device 20 includes a digital display 33 being positionable within a field of view of the user. Preferably, the digital display 33 is directly in front of an eye of the user. The digital display 33 may be implemented within or on the lens of the head wearable device 20, as shown in FIG. 3. The head wearable device 20 includes a camera 32 being configured to capture visual data 26 from a first-person perspective of the user. That is, the camera 32 generally captures visual data 26 from the vantage point seen by the user wearing the head wearable device 20. In other words, the visual data 26 that is captured by the head wearable device 20 is representative of what the user is viewing at the first location 23.

The head wearable device 20 includes a user input device 31 being configured to provide control signals triggered by input from the user. Additionally, the head wearable device 20 includes a non-transitory computer readable memory 67a and one or more processors 28a. The processor 28a is configured to communicate with the digital display 33, camera 32, user input device 31, and memory 67a. The head wearable device 20 may further comprise a speaker 30 and a microphone 62. The microphone 62 may capture audio data 26 during performance of the predetermined task. The audio data 26 may include speech from the user, ambient (environmental sounds), or the like. The speaker 30 may present audio to implement aspects of the interactive training.

The digital display 33 may be presented on a lens of the head wearable device 20 such that the digital display 33 is presented directly in the line of sight of the user. The user may view and control items shown on the digital display 33. The digital display 33 may be an augmented reality display that projects multimedia over real world, physical objects. In one example, the head wearable device 20 includes a pair of augmented reality (AR) glasses having a see-through field-of-view. The user when wearing the glasses is capable of seeing the digital display 33 overlaying the real world experience visible to the user in the see-through field-of-view. The digital display provides 33 a programmed interface appearing in the field of view. The digital display 33 may also be holographic, virtual or the like. However, it is preferred that the user be physically able to see what is really occurring at the first location using one more of their eyes. In other words, the user must be able to physically perform the task without substantial visual obstruction from the head wearable device 20.

The memory 67a has computer-executable instructions stored therein wherein the processor 28a executes the instructions to perform various methods described herein. The head wearable device 20 is programmable with specialized software capable of providing training content and evaluation feedback for implementing the techniques described herein. In one embodiment, the head wearable device 20 need not receive such content from the server 21. That is, the head wearable device 20 stands alone and any training content and feedback is presented in an automated manner from the head wearable device 20 while training the user on performance of the predetermined task. Alternatively, the server 21 may be used in conjunction with the head wearable device 20 to process information and provide training content and feedback. The instructions may be provided onto the memory 67a according to any suitable method. In one example, the instructions are provided by downloading an "app" to the head wearable device 20. Alternatively, the head wearable device 20 may be preprogrammed with the instructions.

In one embodiment, the head wearable device 20 is configured to transmit or receive audio and visual data 26 to or from the server 21 in a live, or real-time, manner. In one example, the audio and visual data 26 is streamed to the server 21. Real-time capture of the audio and visual data 26 reduces cost and time associated with documenting or recording information relating to performance of the task. Alternatively, audio and visual data 26 may be transferred or received periodically. Items presented on the digital display 33 relate to performance, and more specifically, automated directing of the predetermined task. The visual data 26 that is provided to the head wearable device 20 may be any suitable image, photo, video, animation, graphic for interactively training the user to perform the predetermined task. This visual data 26 is displayed in the field-of-view of the user. Examples of such visual data 26 are described in detail below for various tasks.

As shown in FIG. 2, the memory 67a comprises several software modules which are accessible by the processor 28a for implementing the various techniques described herein. Such modules include an analysis module 68a, an evaluation module 69a, a compliance module 70a, a reporting module 71a, and a training style module 72a. The analysis module 68a is responsible for analyzing captured data during the user's performance of the predetermined task. The evaluation module 69a evaluates the user's performance based on analysis of the captured data. The compliance module 70a provides a deeper level of evaluation by more specifically evaluating the user's compliance with any step of the task, or by determining what type of non-compliance occurs. The reporting module 71a is responsible for preparation, modification, and/or generation of a digital report relating to the outcome of the training. The training style module 72a is responsible for implementing and managing a training-style selection program, which helps determine a training modality that is best suited for the user.

As shown in FIG. 4, the user may control the head wearable device 20 according to various methods. For example, the user may provide control signals from any one or more input devices 31. One example of the input device 31 is a touch pad, which may, for instance, detect motions from a finger in contact with the touch pad and render the motions as controls for the head wearable device 20. For example, if the user is presented with a list of items, swiping the finger down on the touch pad moves a cursor on the digital display 33 to the next item, and a tap on the touch pad selects the item. Another method to control the head wearable device 20 is a voice command captured by the microphone 62. Using the microphone 62, the head wearable device 20 may capture and interpret voice commands from the user as controls for the head wearable device 20. For example, the user wearing the head wearable device 20 may say "take photo" while completing the predetermined task. In turn, the head wearable device 20 captures the visual data of the current view of the user. Those skilled in the art may appreciate that other specialized input devices 31 may be utilized for controlling the head wearable device 20, such as a gesture command, compass, light sensor, location/GPS sensor, gyroscope, a tactile button, a neural interface (electro-encephalogram monitor), and the like. Furthermore, the head wearable device 20 may have various other suitable configurations for allowing the user to have a head wearable experience during performance of the predetermined task other than those not specifically described herein.

Using this hardware, the head wearable device 20 is capable of executing various software algorithms, as shown in FIG. 4. For example, the head wearable device 20 may implement environmental occurrence/object recognition, voice recognition, retina detection, gesture detection, object detection, location detection and the like. Examples of how these algorithms are used are provided below.

The head wearable device 20 may have various other configurations. For example, the head wearable device may be an augmented contact lens, head mountable personal camera system, and the like.

The server 21 may assist with or completely implement any of the techniques described herein. As shown in FIG. 2, the server 21 has its own processor 28b and memory 67b has computer-executable instructions stored therein wherein the processor 28b executes the instructions to perform any of the various methods described herein. The server 21 is programmable with specialized software capable of providing training content and evaluation feedback for implementing the techniques described herein. In one embodiment, any training content and feedback is presented to the head wearable device 20 in an automated manner from the serve 21 while training the user on performance of the predetermined task. The instructions may be provided onto the memory 67b of the server 21 according to any suitable method.

As shown in FIG. 2, the memory 67b of the server 21 comprises several software modules which are accessible by the processor 28b for implementing any of the various techniques described herein. Such modules include an analysis module 68b, an evaluation module 69b, a compliance module 70b, a reporting module 71b, and a training style module 72b. Each of the modules may have a similar function as the modules described in relation to the head wearable device 20. In some embodiments, the modules of the head wearable device 20, alone, are sufficient such that the modules of the server 21 need not be utilized. In other embodiments, the modules of the server 21, alone, are sufficient such that the modules of the head wearable device 20 need not be utilized. In yet another embodiment, the modules from each of the head wearable device 20 and server 21 are used in cooperation. Alternatively, some modules may be present on the head wearable device 20 but not on the server 21, and vice-versa. Other modules not specifically described herein may be implemented by any of the processors 28a, 28b.

As shown in FIG. 2, the database 19 is configured to store data that is retrievable by the head wearable device 20 and/or server 21. The data stored in the database 19 includes predetermined task data 73, predetermined objects/motions/sound data 74, predetermined control signals 75, report data 77, training style data 78, login/user data 79, and map data 80. The predetermined task data 73 includes information about the predetermined task or steps of the tasks, such as the steps required, the order of the steps, requirements for completing steps, compliance relating to the steps, or the like. This predetermined task data 73 is retrieved by the head wearable device 20 and/or server 21 to implement foundational aspects of the training. The predetermined objects/motions/sound data 74 includes known audio and visual elements to compare with audio visual 26 elements captured by the microphone 62 and camera 32 of the head wearable device 20 for compliance detection. The predetermined control signal data 75 includes known control signal elements to compare with control signals captured by any one or more input device 31 of the head wearable device 20 for compliance detection. The feedback media 76 includes any suitable animation, photo, video, and audio that are tagged for presentation in response to any suitable non-compliance detection, or specific types of deviations with compliance. The report data 77 may include templates, fields, and predetermined information for digital reports to be generated during or after completion of the training. The report data 77 may also include the generated reports themselves, complied from one or many trainings. The training style data 78 includes data for facilitating the training-style selection program to help determine a best suited training modality for the user. The login/user data 79 includes login information, preferences, and training settings, for users. The map data 80 includes layout information, geographical information, and other location information relating to the first location 23 utilized when a digital map is presented on the head wearable device 20 for directing the user during training, as described below. Other data not specifically described herein may be stored on the database 19. Additionally or additionally, any of the data described above may be stored on the head wearable device 20 and/or server 21.

II. Training Program

The head wearable device 20 is configured to execute a program, which includes any or all of the software modules described herein implemented on the head wearable device 20 and/or the server 21 for directing and training the user to perform the predetermined task. The program is not merely a passive program. Instead, the training program is intelligent by being configured to learn about the live environment and actions of the user and autonomously predict or suggest courses of action based on what is learned. The program may be implemented on the head wearable device 20 and may be hosted by the server 21 or the head wearable device alone 20.

Figure 10:
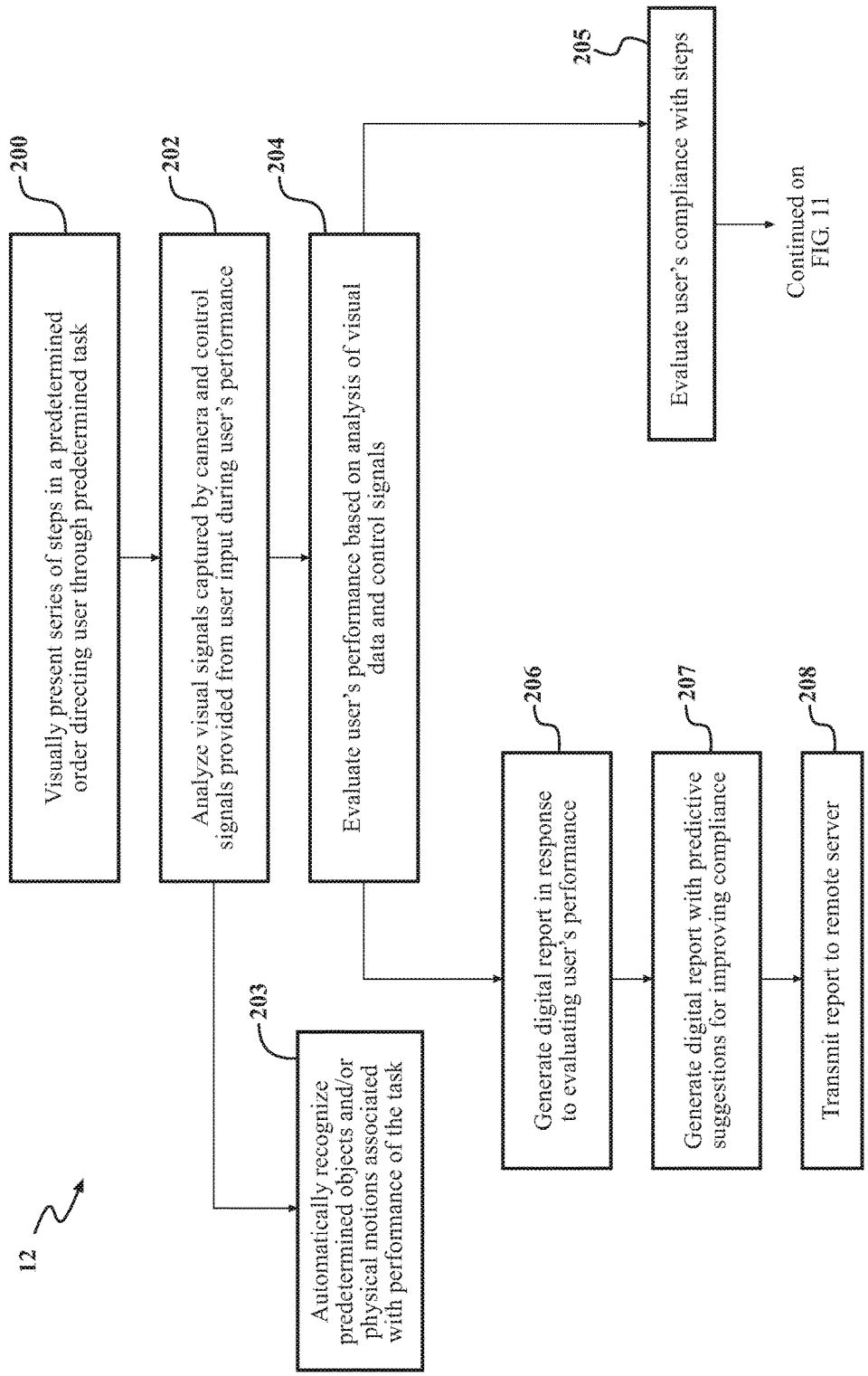
FIG. 10 is a flow diagram of a method for interactively training the user in performing the predetermined task according to one embodiment.

FIG. 10 illustrates one example of the method 12 for training the user to perform the task using the head wearable device 20. One or more processor(s) 28a, 28b instructs the digital display 33 to present a series of steps in a predetermined order directing the user through a process of performing the predetermined task at step 200. The series of steps may be retrieved from the task data 73. At step 202, visual signals captured by the camera 32 and the control signals provided from the user input device 62 are analyzed during the user's attempt to perform the predetermined task according to the series of steps. The analysis module 68a, 68b may implement this step. In one embodiment, the processor(s) 28 analyze visual data by recognizing predetermined objects and/or physical motions associated with performance of the task, as shown at step 203. Such predetermined objects and/or physical motions may be known from the predetermined audio visual data 74. The processor(s) 28 evaluate the user's attempt to perform the predetermined task according to the series of steps based on analysis of the visual data and the control signals at step 204. The evaluation module 69a, 69b may implement this step. In one embodiment, at step 205, the processor(s) 28 evaluate the user's compliance with one or more of the steps, as will be shown in FIG. 11. The compliance module 70a, 70b is used to implement this step. In some embodiments, the processor 28 may also generate digital report in response to evaluating user's attempt to perform the predetermined task according to the series of steps, as shown at step 206. The digital report may include predictive suggestions for improving compliance with at least one of the steps, as shown at step 207. The reporting module 71a, 71b implements this step. At step 208, the digital report may be transmitted from the head wearable device 20 to the remote server 21 such that it can be further reviewed or analyzed. In other embodiments, data captured by the head wearable device 20 is transmitted to the remote server 21 and the processor 28b at the remote server 21 may generate the digital report.

It is to be appreciated that the processor 28b at the remote server 21 is configured to perform, instruct, and/or implement any one or more of the steps described above, individually, or in combination with the processor 28a at the head wearable device 20.

Figure 11:
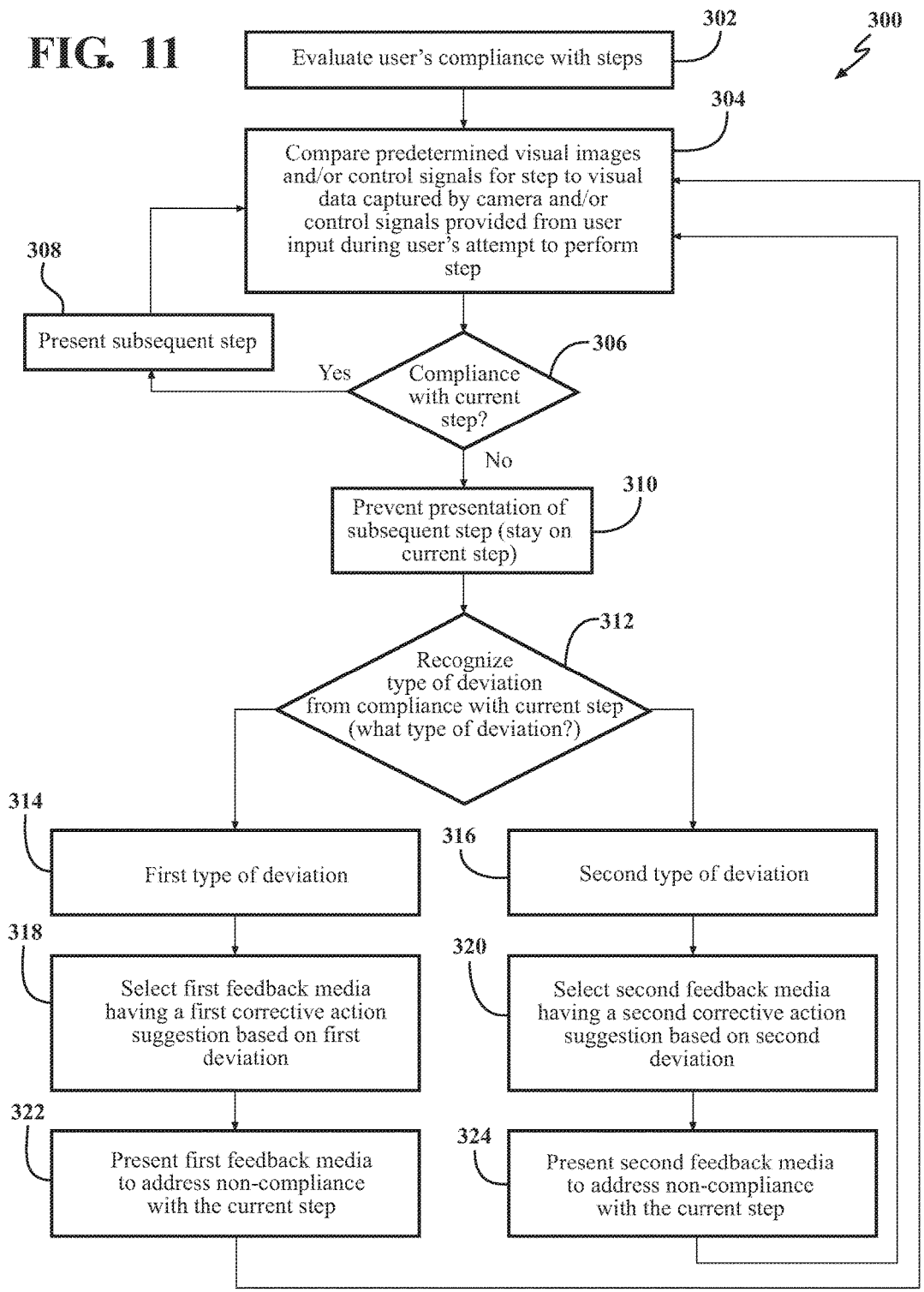
FIG. 11 is a flow diagram of a method for interactively determining user's compliance with one or more steps of the predetermined task according to one embodiment.

FIG. 11 illustrates one example of a method 300 for evaluating the user's compliance with performing the predetermined task, as beginning at step 302. At step 304, one or more processor(s) 28 compare predetermined visual images and/or control signals for one or more of the steps to visual data captured by camera 32 and/or control signals provided from user input device 31 during user's attempt to perform one or more of the steps. This may be done using any of the analysis modules, evaluation modules, and compliance modules, as described herein. At step 306, the processor(s) 28 determine whether compliance with the step is achieved based on the comparison at step 304. If the processor(s) 28 determine proper compliance, the program moves on to the next step in the series, as shown at step 308. Requirements for compliance may be stored in the task data 73. Such compliance checks may be repeated for any one or more successive step until the training is complete, i.e., the task is completed. If the processor(s) 28 determine that the user has failed to comply with the current step based on the analysis, the program will prevent moving on to the next step to implement a "teachable moment" to correct the user's non-compliant action, at step 310. In other words, the program stays on the current step until the user's action reflects that the user understands what is needed to achieve compliance.

The user may fail to comply with the step in various ways. Thus, to account for such variation in deviation dynamically, the program is configured to recognize the type of deviation from compliance with current step, at step 312. In other words, the processor(s) 28 determine what deviation has occurred and provides a different response based on the detected deviation. For example, if compliance with the step requires hand washing for a required time (e.g., 15 seconds), one deviation may be to not wash hands at all, while another deviation would be to wash hands for less than the required time. The processor(s) 28 may determine that the deviation is a first type, as shown at step 314 or a second type, as shown at step 316. If the deviation is the first type, the processor(s) 28 select a first feedback media 90 having a first corrective action suggestion based on first deviation, at step 318. The feedback media 90 may be any suitable media for responding to the user's actions, such as any suitable graphic, video, or animation. The feedback media 90 may be stored in the database at 76 and may be retrieved by the compliance module 70a, 70b. For example, if the first deviation was not washing hands at all, the first feedback media 90 may be presented to explain to the user why hand washing, generally, is required. If the deviation is the second type, the processor(s) 28 select a second feedback media 90 having a second corrective action suggestion based on second deviation, at step 320. For example, if the second deviation was washing hands for less than the required time, the second feedback media 90 may explain why hand washing for the required time is important. At step 322, the processor(s) 28 instruct presentation of the first feedback media 90 to address non-compliance with the current step, which occurred according to the first detected deviation. Alternatively, at step 324, the processor(s) 28 instruct presentation of the second feedback media 90 to address non-compliance with the current step, which occurred according to the second detected deviation. The feedback media 90 may be presented in any suitable visual or audio-visual manner. The feedback media 90 may interrupt any other media 65 relating to performance of the step. Alternatively, the feedback media 90 may supplement other media 65 relating to performance of the step such that the other media 65 is uninterrupted. This may be accomplished, for example, by presenting the feedback media 90 in a corner of the digital display 33, or the like.

The program is implemented on the head wearable device 20 to interactively direct performance of the task. The program directs the user to perform a series of steps necessary to adequately perform the task. Data relating to compliance of the predetermined task is captured during direction of the task. Such data may include any combination of environmental data, compliance data, performance data, feedback data, user data, location data, sensor data, head wearable device data, and the like. The program monitors task compliance in an automated fashion. The program determines, for any one or more steps of the task, whether the user successfully completed or complied with the step using the specialized algorithms and hardware described herein. The program provides real-time feedback based on the monitoring. That is, for example, the program informs the user, based on the captured data, feedback to cure deficiencies in the task step that need correction or feedback to reinforce proper execution of the task step. The program may predicatively analyze captured data in order to improve direction of the predetermined task for future applications. Various examples of these steps are provided in detail for the specific predetermined tasks of training, auditing, and inspecting, as described below. The system 10 and method 12 provide predictive analytics to more accurately drive continuous improvement in the area of performing predetermined tasks. Information during execution of the tasks is electronically captured and analyzed to evolve the directing program. By having such accurate data, the system 10 and method 12 evolve from simply using business intelligence to a model that has been found to be much more effective. Predictive analytics may be implemented using any suitable technique such as regression, machine learning techniques, and the like.

FIGS. 5-9, and 14 show example views of what the user may see while wearing the head wearable device 20. In these Figures, the environmental background that is directly and actually in front of the user is a kitchen area that the user is facing. For simplicity, only one lens of the head wearable device 20 is illustrated in each of FIGS. 5-9, and 14. Those skilled in the art appreciate that one or more lenses may be utilized to implement the method.

Figure 5:
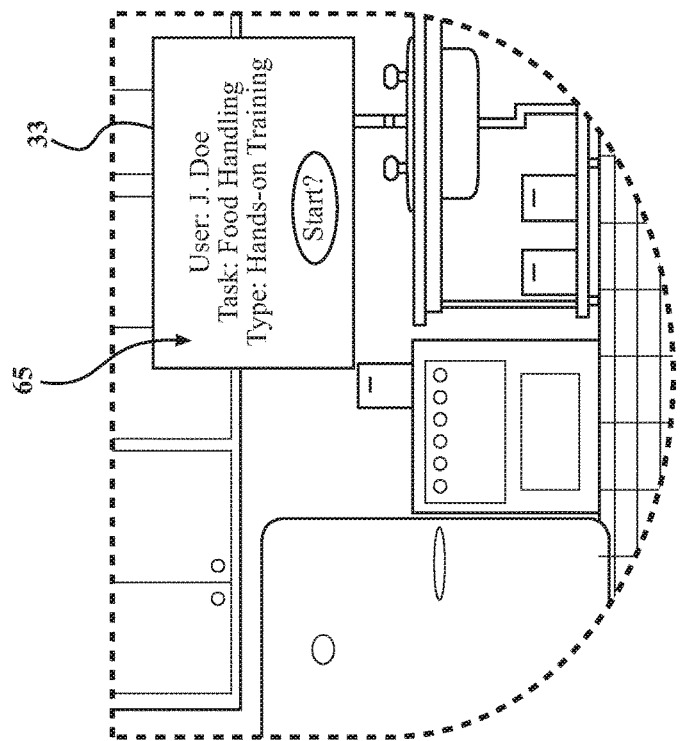
FIG. 5 is an example view for one lens the head wearable device from a first-person perspective of the user wherein the training program identifies the identity of the user and provides an initialization screen.

In FIG. 5, the program determines the identity of the user of the head wearable device 20 to insure there is no foul play. The program may utilize any user input, such as control signals from the input device 31, retina detection or other biometric data to make such determination. The program may provide initialization information in the digital display 33. Such information may reiterate the name of the identified user, the type of program, the type of predetermined task, and the like. Additionally or alternatively, the program may require login information from the user. The program may wait for a start command from the user before the program begins with autonomously directing the task. The wearable device 20 may present any suitable media 65, such as any animation, photo, picture, video, or the like, on the digital display 33 to implement such initialization and/or login.

Figure 6:
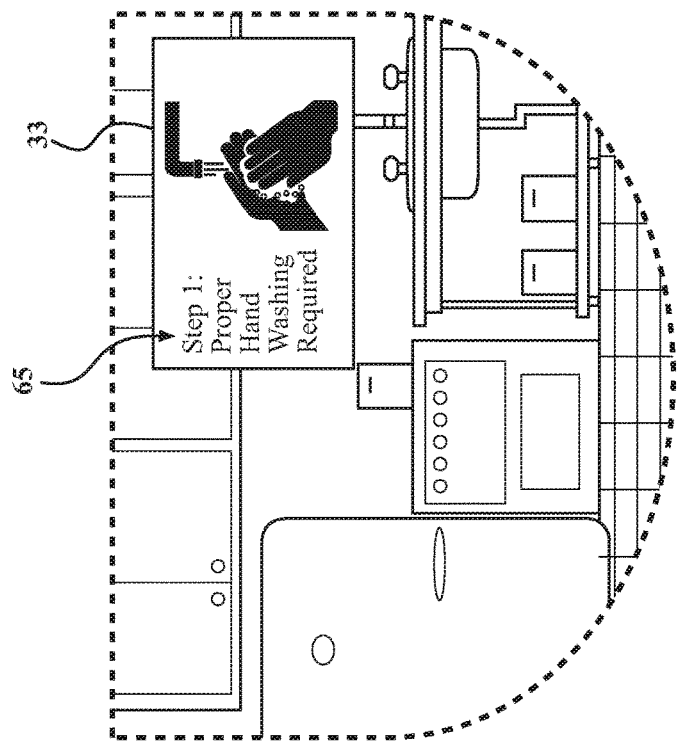
FIG. 6 is an example view for one lens the head wearable device from a first-person perspective of the user wherein the training program visually presents one sample step of a series of steps directing the user through the process of performing the predetermined task.

In FIG. 6, the program directs the head wearable device 20 to present media 65 on the digital display 33 relating to one step of the series of steps involved with performing the predetermined task. For example, the media 65 may provide visual instructions or steps related to proper procedures relating to the predetermined task. Here, the media 65 includes media content relating to hand washing for training the user on proper food handling processes. In other words, in this example, hand washing is one of the steps of the series of steps relating to the task of proper food handling. The program may direct the digital display 33 to provide any other suitable media 65 to train the user interactively, including using checklists, compliance reinforcing or mistake feedback or alerts 90, virtual maps 84, and the like. Additionally, the speaker 30 and microphone 62 of the head wearable device 20 may be utilized to present and capture audio data at the first location to assist in interactive training of the user.

In another example, the user may be required by the program to take a temperature of a food product. The program may employ the techniques above in intelligently recognizing whether the user actually placed the thermometer in the food product. Further still, in this example, the thermometer may be a specialized, digital type, allowing the head wearable device 20 to digitally read the measured temperature automatically without user input, thereby eliminating foul play. Using this information, the program can monitor and collectively determine compliance of the step. This may be performed in addition to, or an alternative to reading the digital thermometer display. The digital thermometer can electronically transmit data to the head wearable device 20 using any suitable technique or means, such as through use of an electronic code, such as a QR code, or the like. Those skilled in the art realize that various other forms of visual data 26 may be presented in the digital display 33 of the device 20 besides those specifically described herein. Moreover, countless examples of autonomous direction, monitoring and improving of performance of the predetermined task may be implemented by the program depending on the specific food safety related task or step required.

III. Predetermined Tasks

Details relating to the food safety, food quality and workplace safety tasks are provided herein. Many examples of the tasks and implementations of the task are provided below. These examples and implementations may at times be described generally for simplicity. However, it is to be understood that where not explicitly stated, each of the examples and implementations relate to the food safety, food quality and workplace safety task, and more specifically, interactively training the user to perform such tasks using the techniques described herein.

The predetermined task is generally concerned with the prevention, management, and elimination of food safety, food quality and workplace safety issues.

When the predetermined task relates to food safety or quality, production, preparation, and/or distribution of food generally occurs at the first location 23. Food may encompass any consumable substance that is ingestible by a living organism. Production, preparation, and/or distribution of food may include any of the following activities involving food including, but not limited to storing, transporting, distributing, selling, packaging, processing, serving, or consuming and the like. Various examples of the predetermined tasks for which the user is to receive training are provided in detail below.

Food quality tasks involve the quality of characteristics of specific food products in effort to determine whether such characteristics are suitable or compliant with predetermined standards, and the like. Food quality may involve assessing a degree of excellence of the food product and may include characteristics of the food, such as taste, appearance, nutritional content, and the like.

Food safety tasks involve the safety in handling, preparing, and storing of food in effort to prevent foodborne illnesses and ensure that the food is fit for consumption.

Workplace safety tasks involve the safety of the workplace from work related illness, hazards, risks, and/or injury in effort to protect safety and health of individuals (e.g., employees) at the workplace. Workplace safety, for example, may be concerned with how, when, where equipment is utilized (e.g., how to use a food slicer), using protective articles (e.g., wearing a helmet), proper techniques relating to physical activity at the workplace (e.g., how to lift heavy items), proper techniques relating to alerting to the presence of or eliminating hazards (e.g., how to clean up a spill and/or where or how to place a sign when there is a spill), and the like. Any of the techniques described herein may be utilized to train the user on performing the task relating to food quality, food safety, or workplace safety.

A. Training

To ensure that such tasks are consistently performed correctly, several methods relating to training may be used. Training is primarily focused on training the user in performing job tasks relating to food safety, food quality and workplace safety. Here, the program implemented on the head wearable device 20 directs such training in an automated fashion. The trainee learns the process for conducting the task from the head wearable device 20. The program may compare captured data during the training to ensure that the trainee is following a process that is consistent with a pre-determined protocol. The program assesses the performance of the trainee and autonomously advises the trainee as necessary to ensure consistency. Training materials for performing the task may be displayed on the digital display 33. The instructions allow the trainee to perform the task with or without the supervision of a lead trainer.

During training, the trainee wears the head wearable device 20 while conducting the task, such as training of a job-function, such as how to prepare or handle food. The trainee is able to view and listen to the session while taking notes and asking questions to the head wearable device 20. The program may recognize speech and provide predetermined answers from the database 19. The database 19 may store such questions and answers to develop an ever-increasing library of information, which can be stored and accessed from the database 19 or learning management system 19.

The program provides interactive training materials to perform certain steps while the trainee performs such steps during training. The program may monitor video and audio during the training to automatically recognize strengths and areas of opportunity for the trainee.

For example, the program may recognize that the trainee did not store food using proper procedure. To provide feedback, the program may immediately interject a short video onto the digital display 33 showing proper food storage protocols. A library of the short videos may be available to the program from the database 19 for countless types of detectable interactive training situations.

The head wearable device 20 may also be utilized for training of employees. Food safety and quality assurance training in the form of instruction, tasks, or tests may be displayed on the head wearable device 20. The training may consist of self-paced learning or active instruction. Results from tests, or task completion data may be automatically monitored and captured from the head wearable device 20 and/or server 21 for further analysis.

The program may be configured to direct the task based on predetermined information about users. In one example, a lead trainer wears the head wearable device 20 and conducts training via "live" video streaming from a restaurant or retail location to a remote audience of trainees at different site locations and cities. The trainees subsequently complete a knowledge assessment on the head wearable device 20 after the training. The results of such assessment may be documented in the database or learning management system 19. The results may dictate a level and a type of retraining that is needed for properly configuring of the program. For example, for food safety, the assessment may determine that most trainees fail to remember that latex gloves must be worn at all times during food preparation. Using this technique, the program may be personalized to each individual user or all users collectively.

The user in training wears the head wearable device 20 and receives self-paced or remote instruction through the digital display 33. The head wearable device 20 may use specialized recognition technologies, such as retina recognition, to bring their personalized training program into the queue. The instruction can be in the form of videos or process checklist instructions. The trainee receives the training in their work environment via the head wearable device 20 and is able to control the training as needed to practice specific elements being taught at the actual site. The benefit of this application compared to traditional training methods is that the trainee is receiving the training in the live work environment versus a remote workstation and has the ability to transfer their knowledge immediately into action. This leads to improved learning retention.

The trainee's knowledge gained is assessed through testing using the head wearable device 20. At the end of the training, the program may request the trainee to complete an electronic assessment that is viewed in the digital display 33 and/or presented audibly and questions may be answered by verbal commands or hand gestures that control the head wearable device 20. The head wearable device 20 provides immediate feedback as to whether questions are answered correctly or not. For those that are not answered correctly, the program is configured to automatically "re-teach" the trainee that key concept by reloading those segments and "retraining." A second test may be implemented by the program to confirm the correct understanding, or the process will be completed again. Subsequently, the trainee may be directed by the program to practice their knowledge by completing an associated concept task in the live work environment. The assessment's results may be automatically downloaded from the head wearable device 20 into the database or learning management system 19.

The trainee's knowledge gained may also be assessed via direct observation of tasks being conducted in the live work environment in various ways. In one embodiment, the user wears the head wearable device 20 while conducting their routine work tasks after initial training and simultaneously records what they are doing via the head wearable device 20. The recording is automatically uploaded to the server 21 and picked up by a remote viewer (assessor) at a later time to determine the accuracy of the work that was performed. The remote viewer documents any errors in process execution and uploads the results to the database 19 or learning management system. This may done using the analysis computer 15. The learning management system 19 automatically identifies areas of retraining that are needed based upon the results and sends feedback, such as an alert to the head wearable device 20. When the head wearable device 20 is subsequently turned back-on, the user receives the alert and is provided the re-training on the head wearable device 20.

In another example, the user wears the head wearable device 20 while conducting their routine work tasks, which are broadcast via live streaming to a remote viewer (assessor) who immediately intervenes and provides retraining and corrective action when the work process steps are performed incorrectly. The remote assessor concurrently documents what has been observed and retrained and uploads the results to the database or learning management system 19. The learning management system 19 automatically identifies areas of retraining that are needed based upon the results and sends an alert to the head wearable device 20. When the head wearable device 20 is subsequently turned back-on, the user receives the alert and is provided with refresher training on the head wearable device 20 based on the area of retraining needed. The user subsequently wears the head wearable device 20 while conducting their routine work tasks after the refresher training. However, this time, the user may have a live assessor or the program may simultaneously record aspects of task via the on the head wearable device 20 and send it to the server 21 so that such information may be picked up and viewed by a remote assessor. The results may be transmitted as described herein.

In other embodiments, the system 10 and method 12 focus on interactive training and knowledge verification conducted by the head wearable device 20 itself utilizing ambient intelligence. In such instances, the system 10 and method 12 eliminate need for a remote assessor. Examples of this embodiment may entail any one, or a combination of, the following training scenarios. In one example, the trainee is trained on a particular food safety, food quality and workplace safety concept, via a training method that may include traditional types of training (classroom, web-based, etc.) or via one of the training methods using the head wearable device 20 outlined above. The trainee's knowledge and ability to execute the task concept properly may be assessed directly via the head wearable device 20.

Using specialized technology, the program is configured to respond immediately to information obtained during performance of the task. To illustrate, for example, as shown in at least FIGS. 6-9, the program is configured to interactively direct and monitor the user on proper hygienic techniques involved with the preparation of food. The program is loaded with a training protocol.

Figure 8:
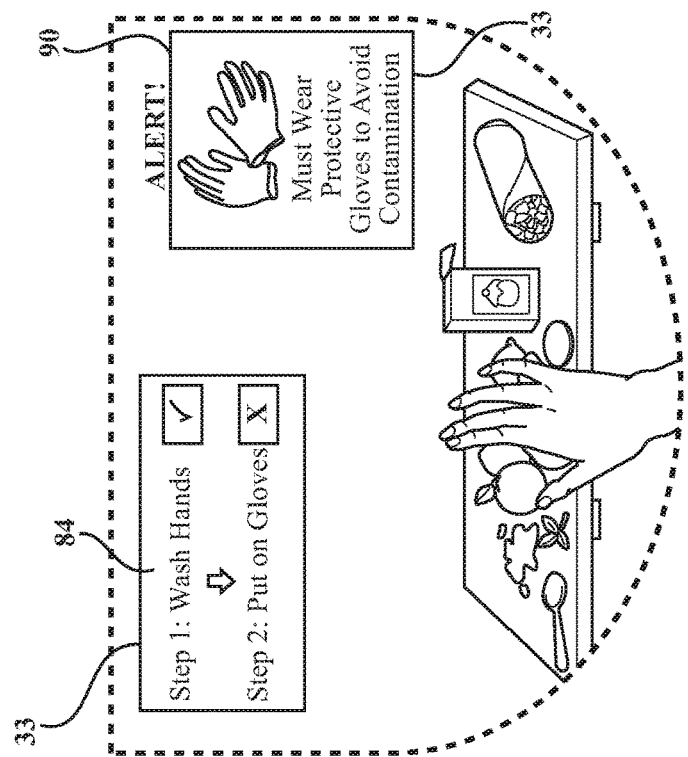
FIG. 8 is an example view for one lens the head wearable device from a first-person perspective of the user wherein the training program recognizes non-compliance with the step and provides feedback in response to recognition of non-compliance.
Figure 7:
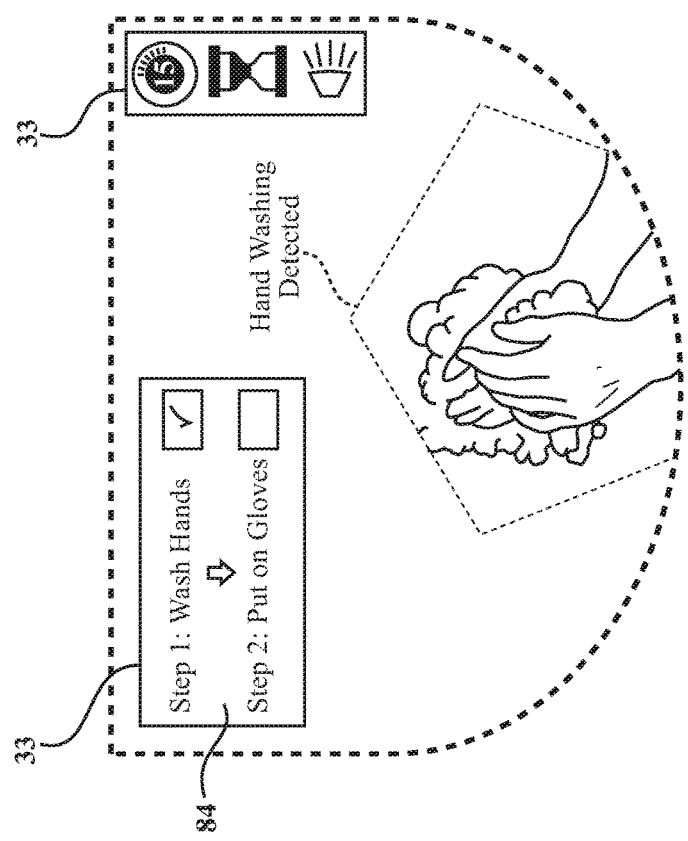
FIG. 7 is an example view for one lens the head wearable device from a first-person perspective of the user wherein the training program analyzes signals captured during the user's attempt to perform the sample step of FIG. 6 to evaluate the user's compliance with the step.

As shown in FIGS. 7-9, a virtual list 84 of the correct process steps at hand may be created in custom software that is uploaded onto the head wearable device 20. The virtual list 84 may have any configuration, such as a virtual and dynamic checklist, or the like. A checklist of immediate and sequential steps necessary for complying with the training protocol is electronically provided in the digital display 33.

Here, the first step is to wash hands. In FIG. 6, the hands of the user appear in the field of view. The program autonomously detects that the user is washing hands. The program may do so by using and gesture recognition and/or object detection algorithms, and the like. The head wearable device 20 may also listen for the sound of running water. The sound of running water may be stored in the database 19 and the recorded sounds may be compared to the stored sounds to make determinations. Once the program detects that hand washing is actually occurring using these techniques, the program may initiate further compliance checks. For example, in FIG. 7, the program causes a timer to be displayed in the corner of the lens allowing the user to visually see how long hand washing has occurred. If hand washing occurs for less than a predetermined amount of time, e.g. 15 seconds, the program may send an alert and determine that non-complaint hand washing has occurred. On the other hand, a check mark appears in the digital display 33 when the program determines that hand washing has occurred in compliance with the protocol.

To further illustrate this example, in FIG. 8, the program directs the user to place on latex gloves during a pre-programmed step of the protocol relating to food safety. The program monitors the field of view of the head wearable device 20 to determine whether the user actually puts on the latex gloves as required by the step. The program is configured to recognize such live actions using any of the techniques described above for hand washing. For example, the database 19 or the head wearable device 20 may have a pre-compiled library of digital envelopes or fingerprints of objects related to food safety tasks or objects, such as the latex gloves, for recognizing these objects in the live environment. In conjunction with the object library, the program may recognize movement of the user based on the field of view. For example, the program recognizes that the user's hands are moving in a manner specific to putting on latex gloves based on software algorithms for monitoring human arm movement or gesture. Those skilled in the art appreciate that some steps of the training may utilize such recognition techniques while steps others may simply use the input device 31 to acquire user feedback. For example, at certain steps, the program may ask the user a question to quiz the user about the specific step. The quiz may be presented in any suitable format, such as, fill-in-the-blank, multiple choice, or the like.

The software provides interactive functionality for the head wearable device 20 that makes the head wearable device 20 capable of recognizing when a deviation from the correct process occurs while the task is being conducted by the trainee who is wearing the head wearable device 20. The program initiates the appropriate task using voice commands or hand gestures from the user, or the like. The trainee subsequently performs the task. The program corrects any out of specification actions while the user is actually performing the task.

For example, an employee who has been trained how to properly make a certain food item while employing appropriate food safety protocols in the process is required by the protocol to begin by washing his/her hands and applying disposable gloves. The employee may in fact wash their hands properly following the virtual list 84 of the correct process steps that have been programmed into the head wearable device 20. However, as shown in FIG. 8, the employee subsequently fails to put on latex gloves before starting food preparation, as required by the program. The head wearable device 20 recognizes that the employee fails to put on the gloves using the aforementioned methods. The program may know where the food preparation workstation is in relation to the hand washing station based on facility layout data. The program also recognizes that the employee has not yet successfully complied with the step of placing on latex gloves. Using this information, in connection with location, pose, and/or compass data, the program can determine that the user has approached the food preparation station without gloves after hand washing. The program may make this determination using various other ways not specifically described herein. Since the user subsequently forgot to put on the gloves upon entering the food assembly station, the program identifies that the process step has been missed and immediately "alerts" the employee. An "X" mark appears in the virtual list 84 in the digital display 33 because the user failed to comply with this step of the protocol.

To facilitate learning, the program generates the feedback media or alert 90 to the user that the step has been missed. One example of such feedback media 90 is illustrated in FIG. 8. Here, the feedback media 90 includes a visible graphic of a pair of latex gloves that electronically appears in the user's field of view. The feedback media 90 may flash such that it is readily visible. The feedback media 90 may be accompanied by any other supplemental alert, such as a haptic or audible alert. The feedback media 90 have also be a video that can temporarily replace the virtual map 84 as shown in FIG. 8.

The program may be configured to then immediately "coach" the user on what should have properly occurred using a written message projected on the digital display 33 that documents the process step that should have occurred and/or a "virtual" graphic that is overlaid directly upon what the user is seeing at the time the step was missed. For example, in future training sessions, the user may see a flashing glove alert just before the user attempts to assemble the food item without properly wearing gloves. That flashing glove image would "float" onto the screen and "move" onto the user's hand reminding them to put on the gloves.

In FIG. 9, the hands of the user once again appear in the field of view. The program autonomously detects that the user is applying gloves. The program may do so by using and gesture recognition and/or object detection algorithms, and the like. The head wearable device 20 may also listen for the sound of latex gloves or plastic. Such sounds may be stored in the database 19 and the recorded sounds may be compared to the stored sounds to make determinations. On the other hand, the camera may recognize gloves based on visual parameters, such as color, texture, shape, and the like. Once the program detects that placement of gloves is successfully occurred in compliance with the protocol, a check mark appears in the digital display 33.

The program may capture records of every process step that is missed. Behavior may be monitored for a preset period. The head wearable device 20, at a set interval of time, may transmit the training opportunities documented to the database or learning management system 19.

The program, in conjunction with the database or learning management system 19, is "smart" and has the ability to determine the frequency with which retraining should occur based upon the results. The program predicts which retraining method would be best or most appropriate based upon the documented opportunities. With this in mind, a user specific training plan is mapped and "queued" in the program.

The user's manager, trainer, or employer may also receive an "alert" through the database or learning management system 19 indicating that re-training is needed for one of their users and the determined frequency. This alert ensures that the manager requires the trainee to wear the head wearable device 20 at appropriate times. The next time the trainee puts on the head wearable device 20 as directed by their manager and powers it up, the head wearable device 20 uses appropriate recognition techniques to bring the personalized training program into the queue.

In further embodiments, the system 10 and method 12 focuses on verification of knowledge retention and transfer of that knowledge into appropriate actions that limit the opportunity for a food safety, food quality or workplace safety error to occur during routine work tasks. One example of such verification is described as follows. The head wearable device 20 allows for multi-tasking through recognition of the user's work environment based upon what the user is seeing. As the user goes about their routine work tasks, the program "knows" what should be occurring from a process perspective based upon what the head wearable device 20 visually recognizes and is capable of employing "just-in-time" alerts, immediate re-training or corrective actions as appropriate based upon the process error that has occurred.

For example, suppose the user wearing the head wearable device 20 has just returned to the restaurant kitchen from break. If the user fails to wash their hands prior to beginning work, the head wearable device 20 corrects the out of specification action via techniques described herein In another example, if the user subsequently forgets to take the temperature of the hamburger being cooked, the head wearable device 20 may correct the out of specification action. Such corrective action may continue throughout the user's shift or for a specified time.

Just as described above, the program keeps records of every process step that is missed. Behavior is monitored for a preset period of time. The head wearable device 20, at a pre-set interval of time, transmits the training opportunities documented to a database or learning management system 19.

After the user ends their shift and the head wearable device 20 is powered down, using voice commands or hand gestures while touching the device's control panel, any remaining documented opportunities are transmitted to a smart database or learning management system 19 and personalized retraining programs are established based upon the results. The user's manager or trainer is also alerted to the training plan through the learning management system 19. The next time the user puts on the head wearable device 20 as directed by their manager and powers it up, the head wearable device 20 uses retina recognition to bring the personalized training program into queue.

Any of the training techniques described above for food safety or quality tasks may be applied fully and equally to any suitable workplace safety task. For example, rather than monitoring food handling procedures, the techniques may monitor whether the user has properly handled equipment for workplace safety reasons. For example, the techniques may assess whether the user has unplugged a food slicer prior to cleaning. The workplace safety tasks may be combined, in whole or in part, with any food quality and/or food safety tasks, and vice-versa. Additional examples of these tasks are described in detail below.

B. Inspection

Another example of the predetermined task is an inspection. For food tasks, the inspection may be the process of examining the facility and food product against specific food safety and quality standards. The inspection process aims to identify food safety issues and correct them before they propagate into recalls and illnesses. The inspection is largely associated with evaluations of specific food products, like seafood, and the corresponding quality characteristics of the food products. Thus, one example of a food quality task is to inspect specific food products to determine compliance of the specific food products with predetermined standards, and the like. Food quality may also relate to a degree of excellence of the food product and may include characteristics, such as taste, appearance, nutritional content, and the like. Inspections may be a formal event, where an independent inspector evaluates food quality and safety, or, an informal event where an internal source performs routine monitoring.

Figure 13:
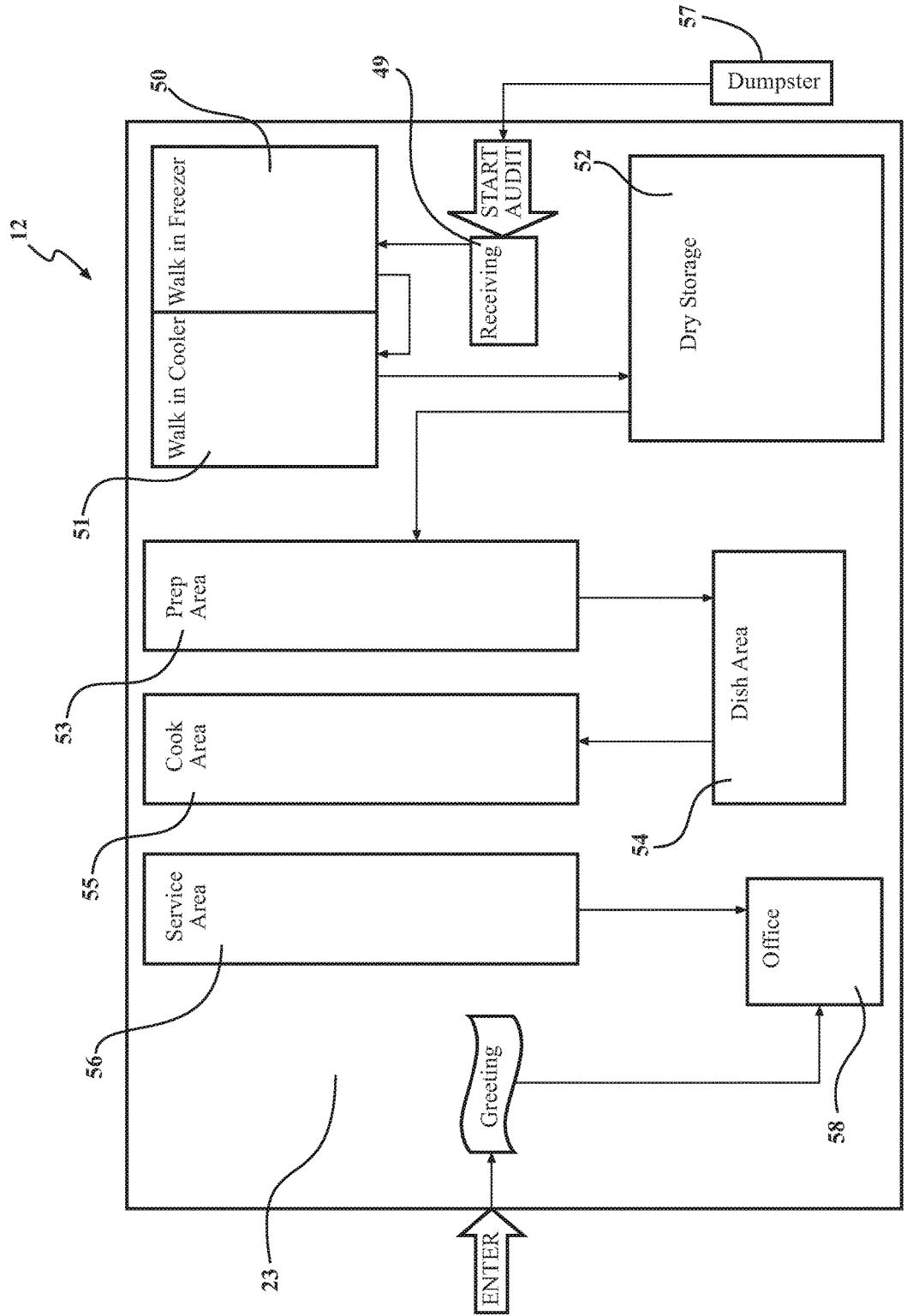
FIG. 13 is a process flow layout showing sample steps that may be performed during execution of the predetermined task using the head wearable device at the first location according to one example.

Several steps are usually performed when the inspection is conducted at the first location 23. These steps often must occur at various steps throughout the facility at the first location 23. FIG. 13 illustrates a sample layout of the first location 23 where the predetermined task, and more specifically, the inspection, may take place. The inspection often must occur at various locations throughout the facility. For example, as shown in FIG. 13, the inspection may start in a receiving area 49, progressing to a walk-in freezer 50 and walk-in cooler 51, a dry storage area 52, a prep area 53, a dish area 54, a cook area 55, and finally a service area 56. The inspection may optionally include areas on the outside of the foodservice facility such as a dumpster 57. The food safety task may also take place in an office 58.

Traditional inspections may be improved using the system 10 and method 12 described herein. That is, any single embodiment, or combination of embodiments, as described above for training, may be suitably modified to autonomously direct, monitor and improve performance of an inspection. Various inspection programs may be stored in the database 19 and loaded into the head wearable device 20 depending on the application. For example, there may be any suitable predetermined inspection program depending on the type of inspection required, and such programs may be tailored to the user, facility, regulation, or the like.

Figure 14:
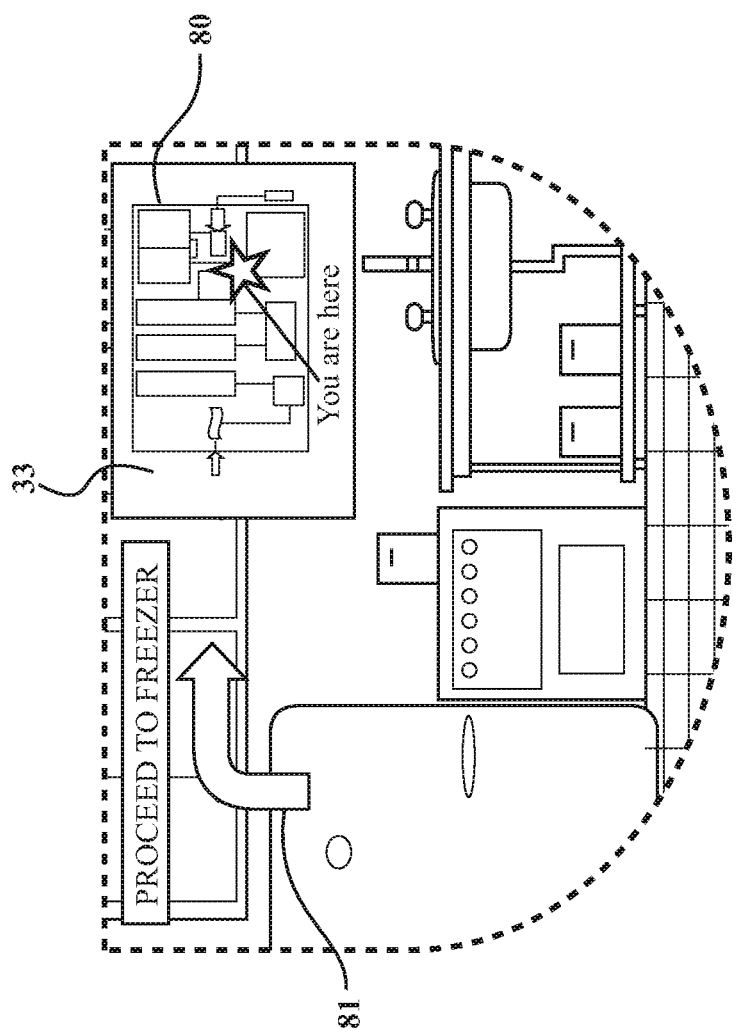
FIG. 14 is yet an example view for one lens the head wearable device from a first-person perspective of the user wherein the training program interactively directs the user to a next location at the first location for performing one or more steps of the predetermined task.

The user wears the head wearable device 20 while performing steps of the inspection. In one embodiment, as shown in FIG. 14, the program provides the virtual map 80 in the digital display 33, which includes an electronic and dynamic layout of the facility. The virtual map 80 is based on the map data and may be implemented using the analysis module 68 to analyze location. Using location sensing, the head wearable device 20 may electronically display the current location of the inspector in the facility. The layout may be pre-determined based on electronic blueprints of the layout of the facility. The layout may be electronically stored in the database 19. Based on predetermined inspection protocols, the program directs the inspector to move to the next location for inspection. As shown in FIG. 14, the program provides directional media 81, which in this example is in the form of an arrow indicating direction on how to reach the next location. The directional media 81 may have any suitable audio, visual, or audiovisual configuration. The program intelligently knows which direction to suggest based on data about the location of the inspector, the layout of the facility, and the next location required for inspection.

Data collection may occur during the inspection. Data collection may take any form known in the art such as, observing, testing, sampling, recording, photographing, etc. The head wearable device 20 is configured to direct the inspector to take samples, such as temperatures during storage or cooking, chlorine and quaternary ammonium sanitizer levels, and other properties. Data collection 40 may be transmitted manually or autonomously through the head wearable device 20. The head wearable device 20 may include input specialized hardware for electronically receiving sampling data. For example, a testing device for measuring temperature or chemical properties may be connected to the head wearable device 20. Alternatively, the head wearable device 20 may extract measurement data from various digital measuring tools or testing devices automatically and wirelessly. The head wearable device 20 may comprise a wireless communication unit 97 configured to allow the head wearable device 20 to communicate to the remote server 19. The processor(s) 28 is configured to instruct wireless transmission data to the remote server 19 or of the digital report, if generated at the head wearable device 20, to the remote server 19.

During the inspection, the data 26 that the inspector collects may come from at least any of the following categories: sanitation, housekeeping, and hygiene; regulatory compliance; temperature controls; allergen management; menu detail and labeling; recordkeeping; quality of food supplies; cook time and temperatures; food storage, proper rotation, and date marking; food identification and labeling; staff training; food defense; rodent and pest management control; and building management, such as garbage, ventilation, lighting, and plumbing.

Following the data collection, such results may be transmitted to the server 21 for further analysis. The head wearable device 20 and/or server 21 may automatically analyze the data that was collected and generate digital reports or recommendations. Alternatively, the head wearable device 20 and/or server 21 may autonomously update the program based on determinations made about the collected data.

Using the collected data, the head wearable device 20 and/or server 21 may also automatically create reports about the predetermined task. The report may have multiple sections for data entry. The sections may include a column of items that were examined as part of the predetermined task, a column showing a grade from the examined item, a column showing a weight average contribution of the grade, and a row showing an overall grade. The grades may be in a numerical or letter standard.

If the server 21 collects such data from a plurality of head wearable devices 20 at different locations, the server 21 can automatically analyze such data to identify correlations or trends in the data. Using the identified correlations or trends, the server 21 may make suggestions or predicatively modify programs implemented on one or a plurality of head wearable devices 20. For instance, the server 21 may acquire inspection duration data from a plurality of inspectors using the head wearable device 20 in various similarly sized facilities. Using this information, the sever 21 may determine that the average time for such inspection is one hour. The server 21 may compare the inspection durations for the inspectors and determine that one inspector took significantly longer than the other inspectors did (e.g., two hours). The server 21 may issue an alert to the head wearable device 20 of the one inspector that future inspections should take about one hour, on average. Those skilled in the art appreciate that countless variations of this implementation are possible depending on what information needs to be communicated or analyzed during the inspection.

Any of the inspection techniques described above for food safety or quality tasks may be applied fully and equally to any suitable workplace safety tasks.

C. Auditing

Yet another example of the predetermined task is an audit relating to food safety, food quality and workplace safety. For food tasks, the audit is generally a process verifying that the systems and training for food safety put in place at the first location 23 are functioning correctly. Contrary to the inspection, of which the objective is to identify and correct food safety issues, the objective of the audit is to evaluate items that may prevent the food safety issue from materializing. The audit establishes that the results of the food safety inspections are both accurate and repeatable.

The steps of the audit process may include the steps of identifying what is supposed to be happening at the first location 23, observing what is happening, collecting information, sorting and analyzing evidence in support of observations, reporting what is found, and following-up to verify issues have been corrected. Those skilled in the art may appreciate that the audit may also verify or test any items indicated as part of the inspection process.

Traditional audits may be improved using the system 10 and method 12 described herein. That is, any single embodiment, or combination of embodiments, as described above for training or inspections, may be suitably modified to autonomously direct and monitor performance of an audit. The user wears the head wearable device 20 while performing steps of the audit. The head wearable device 20 captures audio and visual data 26 such as the first person perspective of the user, shown in the Figures.

The program of the head wearable device 20 is configured to identifying what is supposed to be happening in the live environment. The program is pre-programmed with or dynamically acquires working knowledge of what policies and procedures are being audited to verify compliance. The program is also aware of what training and quality systems have been implemented in order to evaluate effectiveness. Using the specialized technology of the head wearable device 20, the program is configured to observe the environment to determine adherence to the policies, procedures, training, or standards that have been programmed. Evidence in support of the observations is collected by the program allowing objective evaluation of the compliance to the aforementioned policies, procedures, training, or standards. From the observations and evidence, the head wearable device 20 or server 21 can optionally generated the digital report to rank or grade the first location 23, or to provide reference for future audits. The program may request a follow-up be conducted a predetermined length of time after the completion of the first audit to verify any issues that were observed have been resolved.

One type of audit is a manufacturing and processing audit. Manufacturing and processing audits address the adherence to multiple standards, such as local, state, and federal regulations. Additionally, good manufacturing practices (GMPs), process control procedures, and Hazard Analysis and Critical Control Points (HACCP) may be analyzed. During the audit, the program autonomously directs a systematic examination of activities. The program may be pre-loaded to recognize standard operating procedures (SOPs), work instructions to maintain efficient production, and the implementation of management systems. By directing the audit, and collecting data during the audit, the program determines whether the plant complies with SOPs, work instructions, and the implementation of management systems. Manufacturing and processing audits may require that the auditor have experience working in a manufacturing and processing facility to be eligible to conduct the audit. The head wearable device 20 may electronically authenticate the identity of the auditor using retina recognition.

An additional type of audit is a retail audit. Retail audits may be shorter in duration than the manufacturing and processing audit and may be without warning to observe a snapshot in time of overall operations. The standards that are audited against in the retail audit are provided by an entity requesting the audit. The standards may be based on local or national food safety regulations and internal brand standards and policies. Prior to the audit, the program is configured to direct users to perform required food safety and quality procedures at the first location 23.

Just as with training or inspections, the head wearable device 20 and/or server 21 may also automatically assess the data collected during audits. The head wearable device 20 and/or server 21 may create digital reports about audits. The server 21 can collect such data from a plurality of head wearable devices 20 at different locations and automatically analyze such data to identify correlations or trends in the data. Using the identified correlations or trends, the head wearable device 20 and/or server 21 may make suggestions or predicatively modify audit-directing programs implemented on one or a plurality of head wearable devices 20.

D. Other Examples

Non-limiting lists of other examples of the food safety, food quality and workplace safety tasks that may be subject to the training techniques are provided below. The techniques described herein may be utilized for witness sessions to approve auditors, trainers, calibration sessions to solve specific issues with auditors and trainers, training of auditors on site, recording of real examples for auditor calibration exercises, or the like; to perform remote audits, pre-audits, witness testing, follow up inspections and audits for review of corrective actions, and practical training in new product inspections with a trained expert who knows the new process does an inspection wearing the head wearable device 20 while other inspectors watch the process remotely; to provide remote report writing to drive efficiency whereby the auditor speaks the audit report during the audit while a lower cost staff member utilize the audio visual data 26 to generate the report by entering data and/or screen shooting photos to the report, and the like. Such implementations save valuable time of the auditor and cut report turnaround time. Additionally, the system and method may allow the entire task to be recorded such that clients to can observe performance of the entire task, or portions of the task as desired.

Other examples of the food safety and quality task or implementations of the task include witness sessions to approve auditors or trainers; calibration sessions to solve specific issues with auditors or trainers; training of auditors on site; live sessions at a plant, restaurant or field during a training session of trainers or auditors in a class to show examples; follow up sessions for consulting after first visit to review progress; training of crews or managers on the job; remote inspections for consulting when contamination occurs and help is needed to find the problem; recording of real examples for auditor calibration exercises; consulting for restaurants, plants and possibly fields and harvest crews; beverage audits.

Additional examples of the food safety and quality task or uses of the task include calibration audits; providing specification details on-screen during product inspections to help the inspectors check products against detailed specs; product inspector calibration; providing expert support with an office based specialist supporting generalist auditors in the field; practical training in new product inspections using a trained expert knowledgeable of the new process who conducts an inspection wearing the head wearable device 20 while another inspector(s) watch the process remotely; practical training for new audit standards by having trainees observe a new audit process being performed by an experienced, trained auditor; remote translation for the auditor and for users in foreign countries to avoid sending a local auditor abroad for translation; providing expert support for food safety certification programs; providing customer or clients with real time access to a deep dive audit as it is performed; practical webinars in new audit techniques; production line supervision; self audits; assisted self audits; allowing customers to observe audits; training government inspections in audit techniques.

Other examples and uses of the task relate to supply chains. One example includes confirmation checks when a site has a crisis or recall and having an auditor at the first location to carry out the confirmation check and a technical team at the second location working with and directing the auditor. The auditor remotely provides information to the technical team on the actions taken by the site to support the continued use of the certificate and logos. Evidence remotely provided by the techniques described herein can be used to provide verbal and written assurance that corrective actions are in place. Other examples include confirmation of species/substance for sustainability claims. In remote or difficult to access areas, such as fishing trawlers, the techniques described herein could be used to confirm that the product is from a sustainable source or the correct species. Other examples include loading checks for shipping containers (Cargo Tally Verification) by providing confirmation that the number and type of product is loaded into the container before shipping; pre-shipment inspection for import eligibility or tariff classification; assistance with complaint investigation by helping decisions if a recall is required by confirmation of the source or cause of the issue or for providing 'expert witness' in insurance claims.

Additional examples and uses of the task relate to dietary supplements (DS). Examples relating to DS include good manufacturing practices (GMPs) audits; training in GMP; inspections relating to GMP; DS consulting; low risk audits and 6 month program audits; on and off site training, and the like.

In relation to food, the task is generally concerned with the prevention, management, and elimination of food safety issues to minimize risk of illness or product recalls. Production, preparation, and/or distribution of food may occur at the first location 23. Food may encompass any consumable substance that is ingested by a living organism. Production or preparation of food may include any of the following activities involving food such as, storing, transporting, distributing, selling, packaging, processing, serving, or consuming without restriction.

The techniques described herein may also be utilized in relation to food equipment. In food equipment, the focus of the assessment is on the design and construction of the equipment to ensure hygienic design, ease of cleanability and performance as it relates to food safety. Segments of the industry including dishwashers, dispensing, ice making, etc. Such large equipment types present a significant challenge because evaluations must take place at the manufacturer locations due to the complexity, size and set-up requirements for the equipment. With more hundreds of distinct equipment categories, it is a significant challenge to build 'local' expertise for carrying out onsite evaluations and testing, internationally. The techniques can be utilized to deploy real-time, shadow trainings and equipment evaluations for global teams for a fraction of the cost and time. Further examples include conducting a real-time coached training, witness test, or equipment evaluation guided by a locally-based 'expert' while international staff in foreign country locations carry out such tasks; conducting a real-time coached equipment evaluation carried out by an auditor at a client location, while guided by a locally-based 'expert', offering evaluations, witness testing, consultative exploratory sessions and providing key account 'on demand' support anywhere around the world.

Further examples and implementations of the task in relation to audits include performing observational behavior style audits to capture images of staff performing tasks against set standards to improve internal quality standards of a client and share such observations with the client organization. In such instances, images or video captured may be embedded into audit reports. Client organizations will be able to use information captured to develop impactful company-wide corrective actions using the real time examples. Furthermore, the techniques described herein could be performed for critical site food safety non-compliance issues. If there is disagreement about resolution, a certification line manager can see what the auditor has encountered on-site. Additionally, remote auditing can be performed by an in-house staff member for specific audit in a remote geographical location or in a no-go animal welfare bio-security environment, with guidance by a qualified third party auditor.

In further relation to witness audits, an evaluator can take notes and review them later for any issues to address with a trainee auditor as part of corrective actions. Also, the techniques may be used to increase the number of witness audits completed at client locations and reduce need for verifiers to travel to site to verify. Furthermore, integrity audits can be performed where an on-site scheme manager may effectively present as well to overcome any conflicts.

In further relation to self-audits, the techniques described herein may be used as part of technical support during self-audit with clients. For example, this may be useful for retailers during trouble shooting audits. In factory applications, staff can wear the head wearable device at key CCPs to remotely transmit video data relating to e.g., temperature controls etc., to ensure process is being accurately followed. Furthermore, the techniques may be utilized at Slaughterhouses and/or for animal welfare tasks. In addition, remote technical coaching may be provided to client teams while they are undertaking their self-audit.

In further relation to training, trainers can use the techniques described herein so that quality control can be taken on the delivery of training courses and to gauge client interaction. Additionally, training organizations can assess effectiveness of training sessions and improve training delivery through coaching of trainers and review of materials either real time or retrospectively, enhancing training sessions. Training for admin processes can also be performed remotely. Delegates can be at a classroom (second location) while an instructor actually on-farm or on-site (first location) demonstrates compliance criteria in place.

The system and method may additionally be utilized in water programs, such as certification programs for products, certification programs for cooling towers and buildings, pre-audits for cooling towers and buildings, and the like.

IV. Training Style Selection Program

Figure 12:
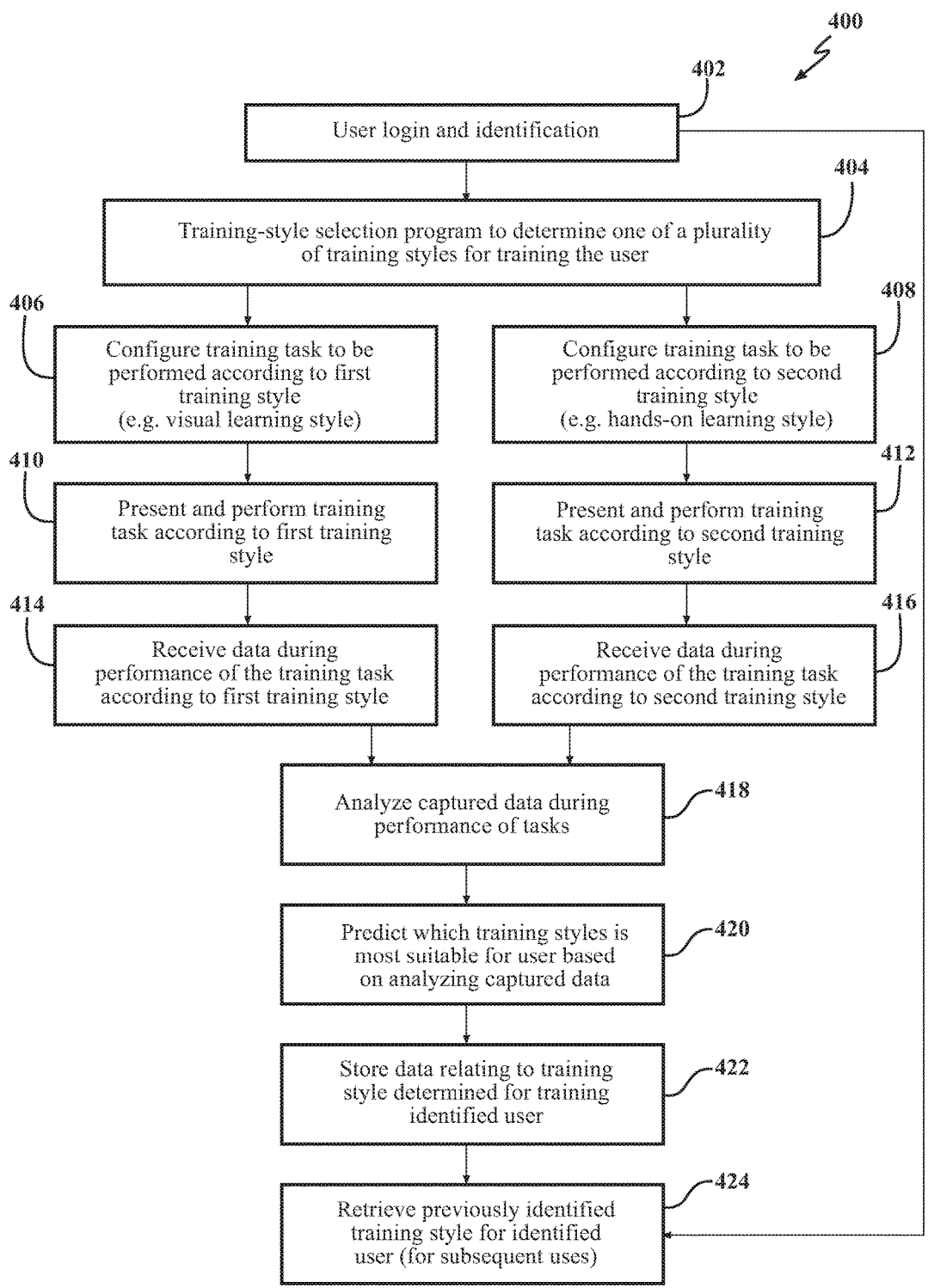
FIG. 12 is a flow diagram of a method relating to a training-style selection program for interactively determining one of a plurality of training styles for training the user according to one embodiment.

FIG. 12 illustrates a method 400 relating to a training-style selection program. The training-style selection program provides a smart way to determine what training modality is most preferred or best suited for the user during training of the predetermined task.

Each individual has a different style by which they acquire and learn information. For example, some learners need visual cues; others prefer hands-on experiences and others may need a combination of the two styles. With this in mind, the training-style selection program has a "smart-style" selection feature that matches the learner with his/her best learning style when training is desired via the head wearable device 20. Accordingly, the training-style selection program increases the effectiveness of the training according to the techniques described herein.

To summarize, the learner would begin training on the head wearable device 20 by taking a "style-match" exercise. In one embodiment, the exercise would teach a basic task or function that needs to be known for their job and preferably may be short and fast-paced. The exercise may include several different focused trainings of the task. For example, one may be a training that is focused on visual cues for learning; another may be focused on hands-on experience and yet another may be a blend of the previous two styles. There may be other training style modalities other than those described herein. In one embodiment, a quick test at the end of each session may be performed and results may be analyzed to determine which style was more successful in teaching the user the job task. After the learner advances through all the selected trainings and the assessment is made as to which style is the best match for the user, the head wearable device 20 may be programmed to set all future training to the same style for a specific user, for any similarly situated users, for any similar predetermined tasks, and/or for any similar locations/facilities.

Another benefit to the training-style selection program is that learners whose primary language is not English (or the local language) have the opportunity to learn through visual cues versus reliance on long word descriptions of tasks that are challenging to understand due to the language barrier. In addition, statistics show that learners can be more motivated when learning through games or challenges. The head wearable device 20 provides this game-like modality.

Now illustrating steps of the method 400 of performing training-style selection program in FIG. 12, according to one example, at step 402, the user may commence with login information and the processor(s) 28 may compare login information with login data 79 in the database 19 to confirm identity. At step 404, the training-style selection program is initiated to determine one of a plurality of training styles for training the user. The training styles may be predetermined and stored in the database as training style data 78. The processor(s) 28 may execute a training style module 72a, 72b implemented at the head wearable device 20 and/or the remote server 21, to access the training style data 78 from the database 19 and perform the training-style selection program. At step 406, the training style module 72a, 72b configures a training task to be performed according to a first training style. For example, this training style may be a visual learning style focusing heavily on training through visual media presented on the digital display 33. At step 410, the training task is presented according to the first training style. The training task may be presented using any one or more of the digital display 33 and speaker 30 of the head wearable device 20, or the like. At step 414, the user performs the training task according to the first training style and data is received during such performance. At step 408, the training style module 72a, 72b configures the training task to be performed according to a second training style. For example, this training style may be a hands-on training style focusing heavily on having the user perform the physical steps required to implement the task. It is to be appreciated that the training task for the first style may be the same, or different from, the training task for the second style. At step 412, the training task is presented according to the second training style. At step 416, the user performs the training task according to the second training style and data is received during such performance. The steps above may be repeated for any suitable number of training styles.

At step 418, the processor(s) 28, using the training style module 72a, 72b, analyze the captured data during performance of the task. Such analysis may determine, for example, that the user had a difficult or easy time with the training. Factors in making such determinations may include duration to complete task, frequency or type of compliance/non-compliance detected, comparisons of received input data to predetermined input data, results of the quick test commencing at the end of each task, or the like. At step 420, the processor(s) 28, predict which training style is most suitable for the user based on analysis of the captured data. The processor(s) 28 may make such predictions using any suitable weighting algorithm, or the like, which takes into account several different factors observed during performance of each task. At step 422, the processor(s) 28 may instruct that the determined training style for the user be stored in memory 67 or in the training style data 78 in the database 19 for later retrieval. At step 424, the determined training style may be retrieved for any subsequent uses (of the user, or any other user). For example, subsequent logins by the user (at step 402) may automatically trigger loading of the determined training style for that user for performance of any one or more predetermined tasks, as described according to the techniques herein.

Additionally, the training style data 78 may be analyzed based on results of the training-style selection program being executed by several different users from various locations to continuously improve predictive analysis. In some embodiments, when predictive analytics comprises enough data, the training style module 72 may predict a training style for subsequent new users thereby reducing the need to have each new user perform the training-style selection program.

In another embodiment, the processor(s) 28 is configured to visually present on the digital display 33 each of the plurality of training styles for selection. This way, the user can quickly select the training style of their choosing using, for example, using the user input 31. In such instances, the processors(s) receive at least one control signal triggered by input from the user for selecting one of the training styles, and the selected training style is loaded during performance of the predetermined task.

V. Food Safety Kit

Figure 15:
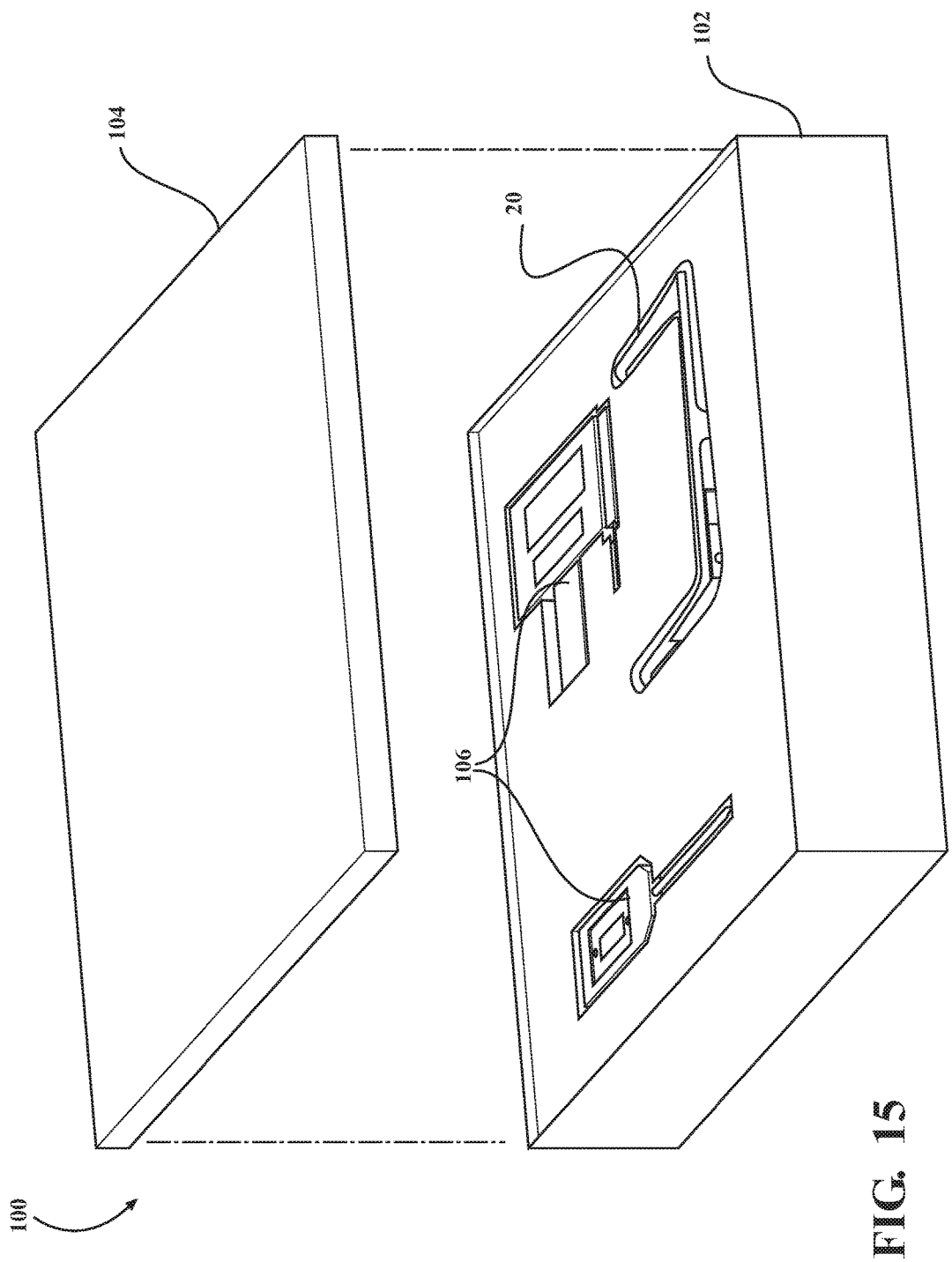
FIG. 15 is a perspective view of one example of a kit for facilitating interactive training of the user in performing the predetermined task.

As part of the system 10 for interactively training performance of the food safety, food quality and workplace safety task a kit 100, as shown in FIG. 15, is provided which houses the items used at the first location 23 for physically carrying out the predetermined task.

Articles useful in physically performing the predetermined task at the first location 23 may be bundled into the kit 100. The kit 100 may include a container 102 that is sealed and has a lid 104. The kit 100 is sent to the first location 23 to provide the user with the items to complete the predetermined task. The kit 100 is sent to the first location 23 either directly from the second location 24, or forwarded from a previous "first location". A third party may send the kit 100 to the first location 23. The user at the first location 23 opens the kit 100. The kit 100 houses the head wearable device 20. The kit 100 also houses at least one other article or tool 106 utilized in physically performing the food safety, food quality and workplace safety task at the first location 23. For example, the at least one other article or tool 106 may comprise connection devices for connecting the head wearable device 20 to the network 22, a charging unit for the head wearable device 20, an external battery pack, a portable hotspot device, and measurement tools, such as a digital thermometer or chemical test strips, chemical testing devices, as well as alcohol swabs, quaternary ammonium cation (quats) testing supplies, a flashlight, etc. The kit 100 may include a utility belt to hold all the necessary equipment easily, and head wearable.

The container 102 is adapted to hold the items during sending to protect and organize the items of the kit. The container 102 can be reusable and may be fitted with a liner that has cutouts for the items in the kit. The liner may be made of foam or energy absorbing material. The kit 100 may have other configurations other than those specifically described herein.

Several embodiments have been discussed in the foregoing description. However, the embodiments discussed herein are not intended to be exhaustive or limit the invention to any particular form. The terminology that has been used is intended to be in the nature of words of description rather than of limitation. Many modifications and variations are possible in light of the above teachings and the invention may be practiced otherwise than as specifically described.

The many features and advantages of the invention are apparent from the detailed specification, and thus, it is intended by the appended claims to cover all such features and advantages of the invention that fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For simplicity in description, each and every possible combination of the claims recited herein are not expressly and separately listed for formalistic purposes. However, it is to be understood that substantive support is intended and inherently provided for combining any combination of the claims recited herein regardless of the specific claim dependency provided upon filing. As such, there is no intention to limit claim support solely to the specific claim dependency provided upon filing. Rights are reserved to change dependency of the claims in any suitable manner after filing.

The invention claimed is:

1. A head wearable device for training a user in performing a predetermined task, said head wearable device comprising:
a digital display being positionable within a field of view of the user;
a camera being configured to capture visual data from a first-person perspective of the user;
a user input device being configured to provide control signals triggered by input from the user;
a non-transitory computer readable memory; and
a processor in communication with said digital display, camera, user input device and memory and wherein said memory includes instructions, which when executed by said processor, cause the processor to:
  instruct the digital display to present a training-style selection program to determine which one of a plurality of training styles is most suitable for training the user to perform the predetermined task;
  retrieve task data from the non-transitory computer readable memory, the task data including a series of steps in a predetermined order for directing the user through a process of performing the predetermined task and the task data further including compliance requirements associated with each of the steps;
  configure presentation of the steps based on the training style determined by the training-style selection program,
  instruct the digital display to visually present one step of the series of steps in accordance with the retrieved task data and the training style determined by the training-style selection program;
  analyze the visual data captured by the camera during visual presentation of the one step on the digital display;
  automatically recognize from the visual data an action associated with performance of the one step;
  evaluate compliance with the one step, wherein evaluating compliance comprises comparing the recognized action to the compliance requirements associated with the one step to determine whether the recognized action satisfies the compliance requirements;
  instruct presentation of a step subsequent to the one step in response to determining that the recognized action satisfies compliance requirements associated with the one step;
  in response to determining that the recognized action fails to satisfy compliance requirements associated with the one step, further comprising the processor being configured to: prevent presentation of the subsequent step; and provide feedback media to the head wearable device, wherein the feedback media comprises a corrective action suggestion configured to address non-compliance with the one step;
  wherein said memory further includes instructions, which when executed by said processor, further cause the processor to:
  access, from a database, map data comprising a virtual map of a facility in which said head-wearable device is being utilized for training;
  instruct presentation of the virtual map on said digital display;
  determine, from the task data, one or more predetermined locations within the facility that are associated with steps for performance of the task;
  track a current location of said head-wearable device in the facility; and
  instruct presentation of directional media on said digital display for directing the user from the current location to the one or more predetermined locations associated with steps for performance of the task.

2. A computer-implemented method for training a user in performing a predetermined task using a head wearable device comprising a digital display being positionable within a field of view of the user, a camera being configured to capture visual data from a first-person perspective of the user, a user input device being configured to provide control signals triggered by input from the user, and a processor in communication with the digital display, camera, user input device and a non-transitory computer readable memory, wherein said computer-implemented method comprises the steps of:
  instructing the digital display, with the processor, to present a training-style selection program to determine which one of a plurality of training styles is most suitable for training the user to perform the predetermined task;
  retrieving, with the processor, task data from the non-transitory computer readable memory, the task data including a series of steps in a predetermined order for directing the user through a process of performing the predetermined task, and the task data further including compliance requirements associated with each of the steps;
  configuring, with the processor, presentation of the steps based on the training style determined by the training-style selection program,
  instructing the digital display, with the processor, to visually present one step of the series of steps in accordance with the retrieved task data and the training style determined by the training-style selection program;
  analyzing, with the processor, the visual data captured by the camera during visual presentation of the one step on the digital display;
  automatically recognizing from the visual data, with the processor, an action associated with performance of the one step;
  evaluating, with the processor, compliance with the one step, wherein evaluating compliance comprises the processor comparing the recognized action to the compliance requirements associated with the one step to determine whether the recognized action satisfies the compliance requirements;
  instructing, with the processor, presentation of a step subsequent to the one step in response to determining that the recognized action satisfies compliance requirements associated with the one step;
  in response to determining that the recognized action fails to satisfy compliance requirements associated with the one step, further comprising the processor: preventing presentation of the subsequent step; and providing feedback media to the head wearable device, wherein the feedback media comprises a corrective action suggestion configured to address non-compliance with the one step;
  said computer-implemented method further comprises the steps of:
  accessing from a database, with the processor, map data comprising a virtual map of a facility in which the head-wearable device is being utilized for training;
  instructing presentation, with the processor, of the virtual map on the digital display;
  determining, from the task data, one or more predetermined locations within the facility that are associated with steps for performance of the task;
  tracking, with an analysis module, a current location of the head-wearable device in the facility; and
  instructing presentation, with the processor, of directional media on the digital display for directing the user from the current location to the one or more predetermined locations associated with steps for performance of the task.

3. The computer-implemented method of claim 2, further comprising:
  analyzing, with the processor, the control signals provided from the user input device during visual presentation of the one step; and
  wherein automatically recognizing the action associated with performance of the one step further comprises automatically recognizing the action based on analysis of the control signals.

4. The computer-implemented method of claim 2, further comprising:
  identifying, with the processor, completion of the series of steps of the predetermined task;
  presenting, with the processor, an electronic assessment upon identifying completion of the series of steps, the electronic assessment being presented visually on the digital display and audibly using a speaker of the head-wearable device and comprising a series of questions relating to performance of the predetermined task;
  capturing the user's response to the series of questions by receiving audio, visual or control signal input from the head-wearable device; and
  automatically transmitting the captured responses to the series of questions of the electronic assessment to a learning management system.

5. The computer-implemented method of claim 4, further comprising:
  analyzing captured responses to the series of questions from a plurality of head-wearable devices;
  predictively identifying a pattern associated with non-compliance of the predetermined task based on analyzing captured responses to the series of questions from the plurality of head-wearable devices; and
  updating the task data, for subsequent training of performance of the predetermined task, based on the identified pattern wherein updating is designed to reduce non-compliance of the predetermined task.

6. The computer-implemented method of claim 2 further comprising:
  recognizing whether a first deviation or a second deviation from compliance with the one step has occurred;
  if the first deviation is recognized:
    selecting a first feedback media having a first corrective action suggestion; and
    providing the first feedback media to the head wearable device in attempt to achieve user compliance with the one step; and
  if the second deviation is recognized:
    selecting a second feedback media having a second corrective action suggestion; and
    providing the second feedback media to the head wearable device in attempt to achieve user compliance with the one step.

7. The computer-implemented method of claim 2 further comprising generating a digital report in response to evaluating the user's attempt to perform the predetermined task according to the series of steps, wherein generating the digital report further comprises generating the digital report to include at least one predictive suggestion for improving compliance with at least one of the steps.

8. The computer-implemented method of claim 2, further comprising a remote server:

acquiring task data from a plurality of head wearable devices to identify predetermined tasks executed with the plurality of the head wearable devices;

acquiring training style data indicative of the results of the training-style selection program being executed by the plurality of head wearable devices;

analyzing the acquired task data and training style data;

predictively identifying one training style from among the plurality of training styles that is best suited for one of the predetermined tasks; and automatically instructing loading of the predictively identified training style for subsequent training in performing the one of the predetermined tasks with the head-wearable device.

9. The computer-implemented method of claim 2 further comprising:

configuring a training task to be performed differently according to each one of the plurality of training styles; and separately presenting the training task according to each one of the plurality of training styles.

10. The computer-implemented method of claim 9 further comprising:

receiving data during performance of the training task according to each one of the plurality of training styles;

analyzing the data captured during performance of the training task according to each one of the plurality of training styles; and predicting which one of the training styles is most suitable for the user based on analyzing the captured data.

11. A non-transitory computer usable medium for use with a head wearable device for training a user in performing a predetermined task, with the head wearable device comprising a digital display being positionable within a field of view of the user, a camera being configured to capture visual data from a first-person perspective of the user, a user input device being configured to provide control signals triggered by input from the user, and a processor in communication with the digital display, camera, user input device and memory, wherein said non-transitory computer usable medium includes instructions, which when executed by the processor, cause the processor to:

instruct the digital display to present a training-style selection program to determine which one of a plurality of training styles is most suitable for training the user to perform the predetermined task;

retrieve task data from the non-transitory computer readable memory, the task data including a series of steps in a predetermined order for directing the user through a process of performing the predetermined task and the task data further including compliance requirements associated with each of the steps;

configure presentation of the steps based on the training style determined by the training-style selection program, instruct the digital display to visually present one step of the series of steps in accordance with the retrieved task data and the training style determined by the training-style selection program;

analyze the visual data captured by the camera during visual presentation of the one step on the digital display;

automatically recognize from the visual data an action associated with performance of the one step;

evaluate compliance with the one step, wherein evaluating compliance comprises comparing the recognized action to the compliance requirements associated with the one step to determine whether the recognized action satisfies the compliance requirements;

instruct presentation of a step subsequent to the one step in response to determining that the recognized action satisfies compliance requirements associated with the one step;

in response to determining that the recognized action fails to satisfy compliance requirements associated with the one step, further comprising the processor being configured to: prevent presentation of the subsequent step; and provide feedback media to the head wearable device, wherein the feedback media comprises a corrective action suggestion configured to address non-compliance with the one step;

said non-transitory computer usable medium further including instructions, which when executed by the processor, further cause the processor to:

access, from a database, map data comprising a virtual map of a facility in which the head-wearable device is being utilized for training;

instruct presentation of the virtual map on the digital display;

determine, from the task data, one or more predetermined locations within the facility that are associated with steps for performance of the task;

track a current location of the head-wearable device in the facility; and instruct presentation of directional media on the digital display for directing the user from the current location to the one or more predetermined locations associated with steps for performance of the task.

12. The non-transitory computer usable medium of claim 11, wherein said instructions, when executed by the processor, further cause the processor to:

analyze the control signals provided from the user input device during visual presentation of the one step; and automatically recognize the action associated with performance of the one step by further being configured to automatically recognize the action based on analysis of the control signals.

13. The non-transitory computer usable medium of claim 11, wherein said instructions, when executed by the processor, further cause the processor to:

identify completion of the series of steps of the predetermined task;

present an electronic assessment upon identifying completion of the series of steps, the electronic assessment being presented visually on the digital display and audibly using a speaker of the head-wearable device and comprising a series of questions relating to performance of the predetermined task;

capture the user's response to the series of questions by receiving audio, visual or control signal input from the head-wearable device; and automatically transmit the captured responses to the series of questions of the electronic assessment to a learning management system.

14. The non-transitory computer usable medium of claim 13, wherein said instructions, when executed by the processor, further cause the processor to:

analyze captured responses to the series of questions from a plurality of head-wearable devices;

predictively identify a pattern associated with non-compliance of the predetermined task based on analyzing captured responses to the series of questions from the plurality of head-wearable devices; and update the task data, for subsequent training of performance of the predetermined task, based on the identified pattern wherein the update is designed to reduce non-compliance of the predetermined task.

15. The non-transitory computer usable medium of claim 11, wherein said instructions, when executed by the processor, further cause the processor to:
   recognize whether a first deviation or a second deviation from compliance with the one step has occurred;
   if the first deviation is recognized:
      select a first feedback media having a first corrective action suggestion; and
      provide the first feedback media to the head wearable device in attempt to achieve user compliance with the one step; and
   if the second deviation is recognized:
      select a second feedback media having a second corrective action suggestion; and
      provide the second feedback media to the head wearable device in attempt to achieve user compliance with the one step.

16. The non-transitory computer usable medium of claim 11, wherein said instructions, when executed by the processor, further cause the processor to:
   generate a digital report in response to evaluating the user's attempt to perform the predetermined task according to the series of steps, wherein the digital report includes at least one predictive suggestion for improving compliance with at least one of the steps.

17. The non-transitory computer usable medium of claim 11, wherein said instructions, when executed by the processor, further cause the processor to:
   acquire task data from a plurality of head wearable devices to identify predetermined tasks executed with the plurality of the head wearable devices;
   acquire training style data indicative of the results of the training-style selection program being executed by the plurality of head wearable devices;
   analyze the acquired task data and training style data;
   predictively identify one training style from among the plurality of training styles that is best suited for one of the predetermined tasks; and
   automatically instruct loading of the predictively identified training style for subsequent training in performing the one of the predetermined tasks with the head-wearable device.

18. The non-transitory computer usable medium of claim 11, wherein said instructions, when executed by the processor, further cause the processor to:
   configure a training task to be performed differently according to each one of the plurality of training styles; and
   separately present the training task according to each one of the plurality of training styles.

19. The non-transitory computer usable medium of claim 18, wherein said instructions, when executed by the processor, further cause the processor to:
   receive data during performance of the training task according to each one of the plurality of training styles;
   analyze the data captured during performance of the training task according to each one of the plurality of training styles; and
   predict which one of the training styles is most suitable for the user based on analyzing the captured data.

20. A head wearable device for training a user in performing a predetermined task, said head wearable device comprising:
   a digital display being positionable within a field of view of the user;
   a camera being configured to capture visual data from a first-person perspective of the user;
   a user input device being configured to provide control signals triggered by input from the user;
   a non-transitory computer readable memory; and
   a processor in communication with said digital display, camera, user input device and memory and wherein said memory includes instructions, which when executed by said processor, cause the processor to:
      instruct the digital display to present a training-style selection program to determine which one of a plurality of training styles is most suitable for training the user to perform the predetermined task;
      retrieve task data from the non-transitory computer readable memory, the task data including a series of steps in a predetermined order for directing the user through a process of performing the predetermined task and the task data further including compliance requirements associated with each of the steps;
      configure presentation of the steps based on the training style determined by the training-style selection program,
      instruct the digital display to visually present one step of the series of steps in accordance with the retrieved task data and the training style determined by the training-style selection program;
      analyze the visual data captured by the camera during visual presentation of the one step on the digital display;
      automatically recognize from the visual data an action associated with performance of the one step;
      evaluate compliance with the one step, wherein evaluating compliance comprises comparing the recognized action to the compliance requirements associated with the one step to determine whether the recognized action satisfies the compliance requirements;
      instruct presentation of a step subsequent to the one step in response to determining that the recognized action satisfies compliance requirements associated with the one step;
      in response to determining that the recognized action fails to satisfy compliance requirements associated with the one step, further comprising the processor being configured to: prevent presentation of the subsequent step; and provide feedback media to the head wearable device, wherein the feedback media comprises a corrective action suggestion configured to address non-compliance with the one step;
   wherein said memory further includes instructions, which when executed by said processor, further cause the processor to:
      identify completion of the series of steps of the predetermined task;
      present an electronic assessment upon identifying completion of the series of steps, the electronic assessment being presented visually on said digital display and audibly using a speaker of said head-wearable device and comprising a series of questions relating to performance of the predetermined task;
      capture the user's response to the series of questions by receiving audio, visual or control signal input from said head-wearable device; and automatically transmit the captured responses to the series of questions of the electronic assessment to a learning management system.

21. A head wearable device for training a user in performing a predetermined task, said head wearable device comprising:
- a digital display being positionable within a field of view of the user;
- a camera being configured to capture visual data from a first-person perspective of the user;
- a user input device being configured to provide control signals triggered by input from the user;
- a non-transitory computer readable memory; and
- a processor in communication with said digital display, camera, user input device and memory and wherein said memory includes instructions, which when executed by said processor, cause the processor to:
  - instruct the digital display to present a training-style selection program to determine which one of a plurality of training styles is most suitable for training the user to perform the predetermined task;
  - retrieve task data from the non-transitory computer readable memory, the task data including a series of steps in a predetermined order for directing the user through a process of performing the predetermined task and the task data further including compliance requirements associated with each of the steps;
  - configure presentation of the steps based on the training style determined by the training-style selection program,
  - instruct the digital display to visually present one step of the series of steps in accordance with the retrieved task data and the training style determined by the training-style selection program;
  - analyze the visual data captured by the camera during visual presentation of the one step on the digital display;
  - automatically recognize from the visual data an action associated with performance of the one step;
  - evaluate compliance with the one step, wherein evaluating compliance comprises comparing the recognized action to the compliance requirements associated with the one step to determine whether the recognized action satisfies the compliance requirements;
  - instruct presentation of a step subsequent to the one step in response to determining that the recognized action satisfies compliance requirements associated with the one step;
  - in response to determining that the recognized action fails to satisfy compliance requirements associated with the one step, further comprising the processor being configured to: prevent presentation of the subsequent step; and provide feedback media to the head wearable device, wherein the feedback media comprises a corrective action suggestion configured to address non-compliance with the one step;
  - wherein said memory further includes instructions, which when executed by said processor, further cause the processor to:
  - acquire task data from a plurality of head wearable devices to identify predetermined tasks executed with the plurality of the head wearable devices;
  - acquire training style data indicative of the results of the training-style selection program being executed by the plurality of head wearable devices;
  - analyze the acquired task data and training style data;
  - predictively identify one training style from among the plurality of training styles that is best suited for one of the predetermined tasks; and
  - automatically instruct loading of the predictively identified training style for subsequent training in performing the one of the predetermined tasks with the head-wearable device.

22. A computer-implemented method for training a user in performing a predetermined task using a head wearable device comprising a digital display being positionable within a field of view of the user, a camera being configured to capture visual data from a first-person perspective of the user, a user input device being configured to provide control signals triggered by input from the user, and a processor in communication with the digital display, camera, user input device and a non-transitory computer readable memory, wherein said computer-implemented method comprises the steps of:
- instructing the digital display, with the processor, to present a training-style selection program to determine which one of a plurality of training styles is most suitable for training the user to perform the predetermined task;
- retrieving, with the processor, task data from the non-transitory computer readable memory, the task data including a series of steps in a predetermined order for directing the user through a process of performing the predetermined task, and the task data further including compliance requirements associated with each of the steps;
- configuring, with the processor, presentation of the steps based on the training style determined by the training-style selection program,
- instructing the digital display, with the processor, to visually present one step of the series of steps in accordance with the retrieved task data and the training style determined by the training-style selection program;
- analyzing, with the processor, the visual data captured by the camera during visual presentation of the one step on the digital display;
- automatically recognizing from the visual data, with the processor, an action associated with performance of the one step;
- evaluating, with the processor, compliance with the one step, wherein evaluating compliance comprises the processor comparing the recognized action to the compliance requirements associated with the one step to determine whether the recognized action satisfies the compliance requirements;
- instructing, with the processor, presentation of a step subsequent to the one step in response to determining that the recognized action satisfies compliance requirements associated with the one step;
- in response to determining that the recognized action fails to satisfy compliance requirements associated with the one step, further comprising the processor: preventing presentation of the subsequent step; and providing feedback media to the head wearable device, wherein the feedback media comprises a corrective action suggestion configured to address non-compliance with the one step;
- said computer-implemented method further comprises the steps of:
- identifying, with the processor, completion of the series of steps of the predetermined task;

presenting, with the processor, an electronic assessment upon identifying completion of the series of steps, the electronic assessment being presented visually on the digital display and audibly using a speaker of the head-wearable device and comprising a series of questions relating to performance of the predetermined task;

capturing the user's response to the series of questions by receiving audio, visual or control signal input from the head-wearable device; and automatically transmitting the captured responses to the series of questions of the electronic assessment to a learning management system.

23. A computer-implemented method for training a user in performing a predetermined task using a head wearable device comprising a digital display being positionable within a field of view of the user, a camera being configured to capture visual data from a first-person perspective of the user, a user input device being configured to provide control signals triggered by input from the user, and a processor in communication with the digital display, camera, user input device and a non-transitory computer readable memory, wherein said computer-implemented method comprises the steps of:

instructing the digital display, with the processor, to present a training-style selection program to determine which one of a plurality of training styles is most suitable for training the user to perform the predetermined task;

retrieving, with the processor, task data from the non-transitory computer readable memory, the task data including a series of steps in a predetermined order for directing the user through a process of performing the predetermined task, and the task data further including compliance requirements associated with each of the steps;

configuring, with the processor, presentation of the steps based on the training style determined by the training-style selection program, instructing the digital display, with the processor, to visually present one step of the series of steps in accordance with the retrieved task data and the training style determined by the training-style selection program;

analyzing, with the processor, the visual data captured by the camera during visual presentation of the one step on the digital display;

automatically recognizing from the visual data, with the processor, an action associated with performance of the one step;

evaluating, with the processor, compliance with the one step, wherein evaluating compliance comprises the processor comparing the recognized action to the compliance requirements associated with the one step to determine whether the recognized action satisfies the compliance requirements;

instructing, with the processor, presentation of a step subsequent to the one step in response to determining that the recognized action satisfies compliance requirements associated with the one step;

in response to determining that the recognized action fails to satisfy compliance requirements associated with the one step, further comprising the processor: preventing presentation of the subsequent step; and providing feedback media to the head wearable device, wherein the feedback media comprises a corrective action suggestion configured to address non-compliance with the one step;

said computer-implemented method further comprises the steps of:

acquiring task data from a plurality of head wearable devices to identify predetermined tasks executed with the plurality of the head wearable devices;

acquiring training style data indicative of the results of the training-style selection program being executed by the plurality of head wearable devices;

analyzing the acquired task data and training style data;

predictively identifying one training style from among the plurality of training styles that is best suited for one of the predetermined tasks; and automatically instructing loading of the predictively identified training style for subsequent training in performing the one of the predetermined tasks with the head-wearable device.

24. A non-transitory computer usable medium for use with a head wearable device for training a user in performing a predetermined task, with the head wearable device comprising a digital display being positionable within a field of view of the user, a camera being configured to capture visual data from a first-person perspective of the user, a user input device being configured to provide control signals triggered by input from the user, and a processor in communication with the digital display, camera, user input device and memory, wherein said non-transitory computer usable medium includes instructions, which when executed by the processor, cause the processor to:

instruct the digital display to present a training-style selection program to determine which one of a plurality of training styles is most suitable for training the user to perform the predetermined task;

retrieve task data from the non-transitory computer readable memory, the task data including a series of steps in a predetermined order for directing the user through a process of performing the predetermined task and the task data further including compliance requirements associated with each of the steps;

configure presentation of the steps based on the training style determined by the training-style selection program, instruct the digital display to visually present one step of the series of steps in accordance with the retrieved task data and the training style determined by the training-style selection program;

analyze the visual data captured by the camera during visual presentation of the one step on the digital display;

automatically recognize from the visual data an action associated with performance of the one step;

evaluate compliance with the one step, wherein evaluating compliance comprises comparing the recognized action to the compliance requirements associated with the one step to determine whether the recognized action satisfies the compliance requirements;

instruct presentation of a step subsequent to the one step in response to determining that the recognized action satisfies compliance requirements associated with the one step;

in response to determining that the recognized action fails to satisfy compliance requirements associated with the one step, further comprising the processor being configured to: prevent presentation of the subsequent step; and provide feedback media to the head wearable device, wherein the feedback media comprises a corrective action suggestion configured to address non-compliance with the one step;

said non-transitory computer usable medium further including instructions, which when executed by the processor, further cause the processor to:

identify completion of the series of steps of the predetermined task;

present an electronic assessment upon identifying completion of the series of steps, the electronic assessment being presented visually on the digital display and audibly using a speaker of the head-wearable device and comprising a series of questions relating to performance of the predetermined task;

capture the user's response to the series of questions by receiving audio, visual or control signal input from the head-wearable device; and automatically transmit the captured responses to the series of questions of the electronic assessment to a learning management system.

25. A non-transitory computer usable medium for use with a head wearable device for training a user in performing a predetermined task, with the head wearable device comprising a digital display being positionable within a field of view of the user, a camera being configured to capture visual data from a first-person perspective of the user, a user input device being configured to provide control signals triggered by input from the user, and a processor in communication with the digital display, camera, user input device and memory, wherein said non-transitory computer usable medium includes instructions, which when executed by the processor, cause the processor to:

instruct the digital display to present a training-style selection program to determine which one of a plurality of training styles is most suitable for training the user to perform the predetermined task;

retrieve task data from the non-transitory computer readable memory, the task data including a series of steps in a predetermined order for directing the user through a process of performing the predetermined task and the task data further including compliance requirements associated with each of the steps;

configure presentation of the steps based on the training style determined by the training-style selection program, instruct the digital display to visually present one step of the series of steps in accordance with the retrieved task data and the training style determined by the training-style selection program;

analyze the visual data captured by the camera during visual presentation of the one step on the digital display;

automatically recognize from the visual data an action associated with performance of the one step;

evaluate compliance with the one step, wherein evaluating compliance comprises comparing the recognized action to the compliance requirements associated with the one step to determine whether the recognized action satisfies the compliance requirements;

instruct presentation of a step subsequent to the one step in response to determining that the recognized action satisfies compliance requirements associated with the one step;

in response to determining that the recognized action fails to satisfy compliance requirements associated with the one step, further comprising the processor being configured to: prevent presentation of the subsequent step; and provide feedback media to the head wearable device, wherein the feedback media comprises a corrective action suggestion configured to address non-compliance with the one step;

said non-transitory computer usable medium further including instructions, which when executed by the processor, further cause the processor to:

acquire task data from a plurality of head wearable devices to identify predetermined tasks executed with the plurality of the head wearable devices;

acquire training style data indicative of the results of the training-style selection program being executed by the plurality of head wearable devices;

analyze the acquired task data and training style data;

predictively identify one training style from among the plurality of training styles that is best suited for one of the predetermined tasks; and automatically instruct loading of the predictively identified training style for subsequent training in performing the one of the predetermined tasks with the head-wearable device.

* * * * *